US012707507B2

(12) United States Patent
Abotabl et al.

(10) Patent No.: US 12,707,507 B2
(45) Date of Patent: Aug. 11, 2026

(54) RANDOM ACCESS OCCASION SELECTION FOR SUBBAND FULL DUPLEX CAPABLE DEVICES

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 360 days.

(21) Appl. No.: 18/443,231

(22) Filed: Feb. 15, 2024

(65) Prior Publication Data

US 2025/0267725 A1 Aug. 21, 2025

(51) Int. Cl.

| | |
|---|---|
| ***H04W 74/0833*** | (2024.01) |
| ***H04L 5/16*** | (2006.01) |
| ***H04W 56/00*** | (2009.01) |
| ***H04W 74/08*** | (2009.01) |
| ***H04W 74/0836*** | (2024.01) |
| ***H04W 76/19*** | (2018.01) |

(52) U.S. Cl.

CPC ........... *H04W 74/0836* (2024.01); *H04L 5/16* (2013.01); *H04W 56/0015* (2013.01); *H04W 74/0875* (2013.01); *H04W 76/19* (2018.02)

(58) Field of Classification Search

CPC ......... H04W 74/0836; H04W 56/0015; H04W 74/0875; H04W 76/19; H04W 74/006; H04W 74/0833; H04W 56/001; H04L 5/16; H04B 7/0695

See application file for complete search history.

(56) References Cited

U.S. PATENT DOCUMENTS

2022/0369366 A1* 11/2022 Zhang ................. H04W 74/002

OTHER PUBLICATIONS

3GPP TS 38.331: "3rd Generation Partnership Project, Technical Specification Group Radio Access Network, NR, Radio Resource Control (RRC) Protocol Specification (Release 18)", 3GPP Organizational Partners, Sophia Antipolis Valbonne, France, 3GPP TS 38.331 V18.0.0, Technical Specification, Dec. 2023, 1608 pages (see pp. 958, 965, 969, 1065).

* cited by examiner

*Primary Examiner* — Said M Elnoubi

(74) *Attorney, Agent, or Firm* — Holland & Hart LLP

(57) ABSTRACT

Methods, systems, and devices for wireless communications are described. A network entity may configure a user equipment (UE) with a first set of ROs and a second set of ROs, and may also provide the UE with information regarding whether the UE is to select an RO from the first set of ROs or the second set of ROs. The information may indicate that the UE is to select an RO from one of the sets of ROs if a measurement is less than a threshold, based on a calculated transmit power for the respective candidate ROs, based on a priority level of a random access message, remaining delay budget (RDB), or payload size of the random access message, based on a use case of the random access message, based on which RO occurs first in time, based on an explicit instruction, or any combination thereof.

30 Claims, 16 Drawing Sheets

RANDOM ACCESS OCCASION SELECTION FOR SUBBAND FULL DUPLEX CAPABLE DEVICES

FIELD OF TECHNOLOGY

The following relates to wireless communications, including random access occasion (RO) selection for subband full duplex (SBFD) capable devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support random access occasion (RO) selection for subband full duplex (SBFD) capable devices. For example, a network entity may configure a user equipment (UE) with a first set of ROs (e.g., SBFD ROs) and a second set of ROs (e.g., half duplex (HD) ROs), and may also provide the UE with information regarding whether the UE is to select an RO from the first set of ROs or the second set of ROs. For example, the information may prevent the UE from using SBFD ROs if a measurement (e.g., a reference signal receive power for a given beam) is less than a threshold, or may instruct the UE to use an SBFD RO or the HD RO based on calculated transmit power for the respective candidate ROs. In some examples, the information may instruct the UE to use an SBFD RO or a legacy RO based on a priority level of a random access message, remaining delay budget (RDB), or payload size of the random access message. In some examples, the information may instruct the UE to select an SBFD RO or a legacy RO based on a use case of the random access message (e.g., initial access, two-step or four-step random access, system information (SI) request, beam failure recovery (BFR) request, connection setup, among other examples). In some examples, the information may instruct the UE to select the SBFD RO or the legacy RO (e.g., corresponding to a same beam) based on which RO occurs first in time. In some examples, the network may indicate (e.g., via higher layer signaling) which of the two ROs the UE is to use. In some examples, multiple criteria may be considered in a particular order to determine which RO the UE is to use.

A method for wireless communications by a UE is described. The method may include receiving control signaling indicating a first set of random access occasions corresponding to a full duplex mode of operation and a second set of random access occasions associated with a HD mode of operation, receiving a control message including information associated with a determination of whether to select a random access occasion from the first set of random access occasions or from the second set of random access occasions, and transmitting a random access message via a first random access occasion that is selected, based on the information, from the first set of random access occasions or from the second set of random access occasions.

A UE for wireless communications is described. The UE may include one or more memories storing processor executable code, and one or more processors coupled with the one or more memories. The one or more processors may individually or collectively be operable to execute the code to cause the UE to receive control signaling indicating a first set of random access occasions corresponding to a full duplex mode of operation and a second set of random access occasions associated with a HD mode of operation, receive a control message including information associated with a determination of whether to select a random access occasion from the first set of random access occasions or from the second set of random access occasions, and transmit a random access message via a first random access occasion that is selected, based on the information, from the first set of random access occasions or from the second set of random access occasions.

Another UE for wireless communications is described. The UE may include means for receiving control signaling indicating a first set of random access occasions corresponding to a full duplex mode of operation and a second set of random access occasions associated with a HD mode of operation, means for receiving a control message including information associated with a determination of whether to select a random access occasion from the first set of random access occasions or from the second set of random access occasions, and means for transmitting a random access message via a first random access occasion that is selected, based on the information, from the first set of random access occasions or from the second set of random access occasions.

A non-transitory computer-readable medium storing code for wireless communications is described. The code may include instructions executable by one or more processors to receive control signaling indicating a first set of random access occasions corresponding to a full duplex mode of operation and a second set of random access occasions associated with a HD mode of operation, receive a control message including information associated with a determination of whether to select a random access occasion from the first set of random access occasions or from the second set of random access occasions, and transmit a random access message via a first random access occasion that is selected, based on the information, from the first set of random access occasions or from the second set of random access occasions.

Some examples of the method, UEs and non-transitory computer-readable medium described herein may further include operations, features, means, or instructions for receiving a set of multiple synchronization signal block signals via a set of multiple beams, where a first beam of the set of multiple beams corresponds to the first random access occasion and performing a reference signal receive power measurement for each respective beam of the set of multiple beams, where selecting the first random access occasion may be based on a first reference signal receive power measurement of at least the first beam satisfying a first threshold value corresponding to a SBFD mode.

In some examples of the method, UEs, and non-transitory computer-readable medium described herein, the information includes an indication of the first threshold value corresponding to the SBFD mode.

In some examples of the method, UEs, and non-transitory computer-readable medium described herein, the information includes a set of multiple threshold values including the first threshold value, each threshold value of the set of multiple threshold values corresponding to a respective beam of the set of multiple beams.

In some examples of the method, UEs, and non-transitory computer-readable medium described herein, the information includes a set of multiple threshold values including the first threshold value, each threshold value of the set of multiple threshold values corresponding to a type of random access transmission and selecting the first random access occasion may be based on the random access message corresponding to a first type of random access transmission associated with the first threshold value.

Some examples of the method, UEs, and non-transitory computer-readable medium described herein may further include operations, features, means, or instructions for calculating a first transmit power corresponding to a first candidate random access occasion of the first set of random access occasions and a second transmit power corresponding to a second candidate random access occasion of the second set of random access occasions, where the first random access occasion includes either the first candidate random access occasion or the second candidate random access occasion, and where the selecting may be based on the first transmit power or the second transmit power satisfying a transmit power threshold.

In some examples of the method, UEs, and non-transitory computer-readable medium described herein, the information includes an indication of the transmit power threshold.

In some examples of the method, UEs, and non-transitory computer-readable medium described herein, the information includes a set of multiple transmit power thresholds including the transmit power threshold, each transmit power threshold of the set of multiple transmit power thresholds corresponding to a respective beam of a set of multiple beams.

In some examples of the method, UEs, and non-transitory computer-readable medium described herein, the transmit power threshold may be based on a frequency resource of the first random access occasion.

Some examples of the method, UEs, and non-transitory computer-readable medium described herein may further include operations, features, means, or instructions for selecting the first random access occasion may be based on whether a priority level of the random access message satisfies a priority level threshold, a remaining delay budget corresponding to an uplink package including the random access message satisfies a remaining delay budget threshold, a size of a payload of the random access message satisfies a payload size threshold, or any combination thereof.

In some examples of the method, UEs, and non-transitory computer-readable medium described herein, the information includes an indication of the priority level threshold, the remaining delay budget threshold, the payload size threshold, or any combination thereof.

Some examples of the method, UEs, and non-transitory computer-readable medium described herein may further include operations, features, means, or instructions for selecting the first random access occasion may be based on a type of the random access message and the type of the random access message includes a message in a two-step random access procedure, a message in a four-step random access procedure, a system information request, a beam failure recovery request, or a connection setup message.

In some examples of the method, UEs, and non-transitory computer-readable medium described herein, the information includes an indication of whether the UE may be to select the first random access occasion from the first set of random access occasions or from the second set of random access occasions for each type of the random access message.

Some examples of the method, UEs, and non-transitory computer-readable medium described herein may further include operations, features, means, or instructions for selecting the first random access occasion may be based on the first random access occasion of the first set of random access occasions occurring prior to a candidate random access occasion of the second set of random access occasions.

In some examples of the method, UEs, and non-transitory computer-readable medium described herein, the control message includes a radio resource control message indicating the first set of random access occasions or the second set of random access occasions and selecting the first random access occasion may be based on the radio resource control message.

A method for wireless communications by a network entity is described. The method may include outputting control signaling indicating a first set of random access occasions corresponding to a full duplex mode of operation and a second set of random access occasions associated with a HD mode of operation, outputting a control message including information associated with a determination of whether to use a random access occasion from the first set of random access occasions or from the second set of random access occasions, and obtaining a random access message via a first random access occasion of the first set of random access occasions or the second set of random access occasions based on outputting the control message including the information.

A network entity for wireless communications is described. The network entity may include one or more memories storing processor executable code, and one or more processors coupled with the one or more memories. The one or more processors may individually or collectively be operable to execute the code to cause the network entity to output control signaling indicating a first set of random access occasions corresponding to a full duplex mode of operation and a second set of random access occasions associated with a HD mode of operation, output a control message including information associated with a determination of whether to use a random access occasion from the first set of random access occasions or from the second set of random access occasions, and obtain a random access message via a first random access occasion of the first set of random access occasions or the second set of random access occasions based on outputting the control message including the information.

Another network entity for wireless communications is described. The network entity may include means for outputting control signaling indicating a first set of random access occasions corresponding to a full duplex mode of operation and a second set of random access occasions associated with a HD mode of operation, means for outputting a control message including information associated with a determination of whether to use a random access occasion from the first set of random access occasions or from the second set of random access occasions, and means for obtaining a random access message via a first random access occasion of the first set of random access occasions or the second set of random access occasions based on outputting the control message including the information.

A non-transitory computer-readable medium storing code for wireless communications is described. The code may include instructions executable by one or more processors to output control signaling indicating a first set of random access occasions corresponding to a full duplex mode of operation and a second set of random access occasions associated with a HD mode of operation, output a control message including information associated with a determination of whether to use a random access occasion from the first set of random access occasions or from the second set of random access occasions, and obtain a random access message via a first random access occasion of the first set of random access occasions or the second set of random access occasions based on outputting the control message including the information.

In some examples of the method, network entities, and non-transitory computer-readable medium described herein, the information includes an indication of a first threshold value corresponding to the full duplex mode and obtaining the random access message via the first random access occasion may be based on the first threshold value.

In some examples of the method, network entities, and non-transitory computer-readable medium described herein, the information includes a set of multiple threshold values, each threshold value of the set of multiple threshold values corresponding to a respective beam of a set of multiple beams, and obtaining the random access message via the first random access occasion may be based on the set of multiple threshold values.

In some examples of the method, network entities, and non-transitory computer-readable medium described herein, the information includes a set of multiple threshold values, each threshold value of the set of multiple threshold values corresponding to a type of random access transmission, and obtaining the random access message via the first random access occasion may be based on the random access message corresponding to a first type of random access transmission associated with a first threshold value of the set of multiple threshold values.

In some examples of the method, network entities, and non-transitory computer-readable medium described herein, the information includes an indication of a transmit power threshold, and obtaining the random access message via the first random access occasion may be based on a transmit power for the random access message satisfying the transmit power threshold.

In some examples of the method, network entities, and non-transitory computer-readable medium described herein, the transmit power threshold may be based on a frequency resource of the first random access occasion.

Some examples of the method, network entities, and non-transitory computer-readable medium described herein may further include operations, features, means, or instructions for obtaining the random access message via the first random access occasion may be based on whether a priority level of the random access message satisfies a priority level threshold, a remaining delay budget corresponding to an uplink package including the random access message satisfies a remaining delay budget threshold, a size of a payload of the random access message satisfies a payload size threshold, or any combination thereof.

In some examples of the method, network entities, and non-transitory computer-readable medium described herein, the information includes an indication of the priority level threshold, the remaining delay budget threshold, the payload size threshold, or any combination thereof.

Some examples of the method, network entities, and non-transitory computer-readable medium described herein may further include operations, features, means, or instructions for obtaining the random access message via the first random access occasion may be based on a type of the random access message, and the type of the random access message includes a message in a two-step random access procedure, a message in a four-step random access procedure, a system information request, a beam failure recovery request, or a connection setup message.

In some examples of the method, network entities, and non-transitory computer-readable medium described herein, the information includes an indication of whether the first random access occasion may be selected from the first set of random access occasions or from the second set of random access occasions for each type of the random access message.

Some examples of the method, network entities, and non-transitory computer-readable medium described herein may further include operations, features, means, or instructions for obtaining the random access message via the first random access occasion may be based on the first random access occasion of the first set of random access occasions occurring prior to a candidate random access occasion of the second set of random access occasions.

In some examples of the method, network entities, and non-transitory computer-readable medium described herein, the control message includes a radio resource control message indicating the first set of random access occasions or the second set of random access occasions and obtaining the random access message via the first random access occasion may be based on the radio resource control message.

DETAILED DESCRIPTION

Figure 1:
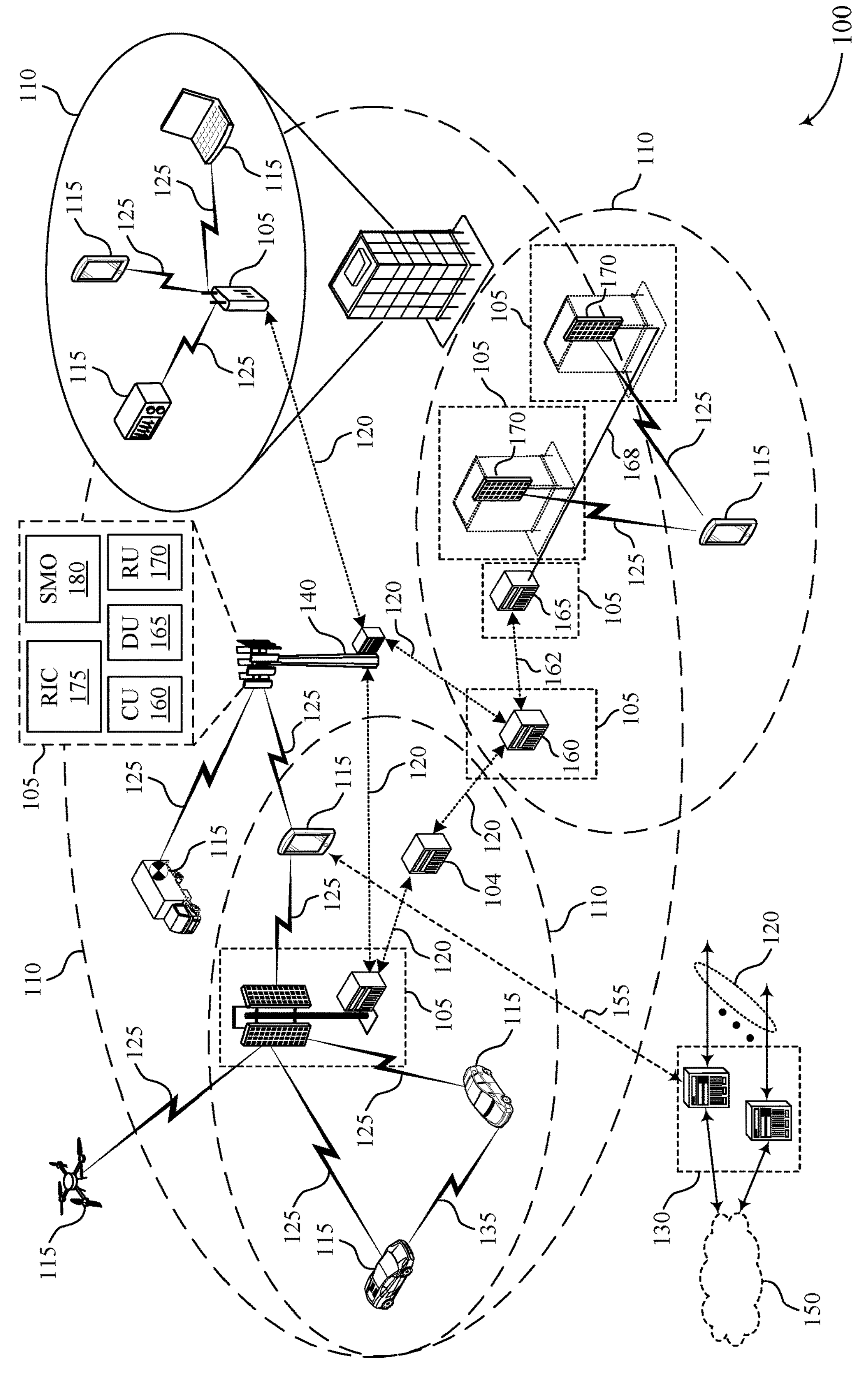
FIG. 1 shows an example of a wireless communications system that supports random access occasion (RO) selection for subband full duplex (SBFD) capable devices in accordance with one or more aspects of the present disclosure.

A user equipment (UE) may perform random access procedures in various use cases. For example, the UE may perform measurements on one or more beams, select a random access occasion (RO) corresponding to one of the measured beams, and transmit a random access message. In some cases, the UE may be configured with multiple (e.g., two) sets of ROs (e.g., via one configuration interpreted two ways, or via two separate configurations). A first set of ROs may be configured for a first duplex type (e.g., subband full duplex (SBFD) operations) and a second set of ROs may be configured for a second duplex type (e.g., half duplex (HD) operations). In some examples, a UE that is SBFD capable may be able to send random access signaling via an RO from either set of ROs. However, it may not be clear to the UE which RO to use. Using an SBFD RO may be faster in some cases (e.g., may occur prior to a legacy RO), and if the UE selects a HD RO, the system may experience increased latency and delays. However, in some cases (e.g., if the UE is located at a cell edge), transmitting a random access message via an SBFD RO at a high transmit power or via resources that are close in the frequency domain to downlink resources, may result in increased cross-link interference (CLI) at other UEs. Thus, without a mechanism for determining whether to use a legacy RO or an SBFD RO, one or more UEs may experience increased system latency, decreased reliability of wireless signaling, increased CLI, and decreased system efficiency.

As described herein, the network may configure the UE with a first set of ROs (e.g., SBFD ROs) and a second set of ROs (e.g., HD ROs). The network may also provide the UE with information regarding whether the UE is to select an RO from the first set of ROs or the second set of ROs. For example, the information may prevent the UE from using SBFD ROs if an SSB RSRP (e.g., for a given beam) is less than a threshold, or may instruct the UE to use an SBFD RO or the HD RO based on calculated transmit power for the respective candidate ROs. In some examples, the information may instruct the UE to use an SBFD RO or a legacy RO based on a priority level of a random access message, remaining delay budget (RDB), or payload size of the random access message. In some examples, the information may instruct the UE to select an SBFD RO or a legacy RO based on a use case of the random access message (e.g., initial access, two-step or four-step random access, system information (SI) request, beam failure recovery (BFR) request, connection setup, among other examples). In some examples, the information may instruct the UE to select the SBFD RO or the legacy RO (e.g., corresponding to a same beam) based on which RO occurs first in time. In some examples, the network may indicate (e.g., via higher layer signaling) which of the two ROs the UE is to use. In some examples, multiple criteria may be considered in a particular order to determine which RO the UE is to use.

Aspects of the disclosure are initially described in the context of wireless communications systems. Aspects of the disclosure are further illustrated by and described with reference to wireless communications systems, RO selection schemes, and process flows. Aspects of the disclosure are further illustrated by and described with reference to apparatus diagrams, system diagrams, and flowcharts that relate to RO selection for SBFD capable devices.

FIG. 1 shows an example of a wireless communications system 100 that supports RO selection for SBFD capable devices in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

For instance, an access network (AN) or RAN may include communications between access nodes (e.g., an IAB donor), IAB node(s) 104, and one or more UEs 115. The IAB donor may facilitate connection between the core network 130 and the AN (e.g., via a wired or wireless connection to the core network 130). That is, an IAB donor may refer to a RAN node with a wired or wireless connection to the core network 130. The IAB donor may include one or more of a CU 160, a DU 165, and an RU 170, in which case the CU 160 may communicate with the core network 130 via an interface (e.g., a backhaul link). The IAB donor and IAB node(s) 104 may communicate via an F1 interface according to a protocol that defines signaling messages (e.g., an F1 AP protocol). Additionally, or alternatively, the CU 160 may communicate with the core network 130 via an interface, which may be an example of a portion of a backhaul link, and may communicate with other CUs (e.g., including a CU 160 associated with an alternative IAB donor) via an Xn-C interface, which may be an example of another portion of a backhaul link.

IAB node(s) 104 may refer to RAN nodes that provide IAB functionality (e.g., access for UEs 115, wireless self-backhauling capabilities). A DU 165 may act as a distributed scheduling node towards child nodes associated with the IAB node(s) 104, and the IAB-MT may act as a scheduled node towards parent nodes associated with IAB node(s) 104. That is, an IAB donor may be referred to as a parent node in communication with one or more child nodes (e.g., an IAB donor may relay transmissions for UEs through other IAB node(s) 104). Additionally, or alternatively, IAB node(s) 104 may also be referred to as parent nodes or child nodes to other IAB node(s) 104, depending on the relay chain or configuration of the AN. The IAB-MT entity of IAB node(s) 104 may provide a Uu interface for a child IAB node (e.g., the IAB node(s) 104) to receive signaling from a parent IAB node (e.g., the IAB node(s) 104), and a DU interface (e.g., a DU 165) may provide a Uu interface for a parent IAB node to signal to a child IAB node or UE 115.

For example, IAB node(s) 104 may be referred to as parent nodes that support communications for child IAB nodes, or may be referred to as child IAB nodes associated with IAB donors, or both. An IAB donor may include a CU 160 with a wired or wireless connection (e.g., backhaul communication link(s) 120) to the core network 130 and may act as a parent node to IAB node(s) 104. For example, the DU 165 of an IAB donor may relay transmissions to UEs 115 through IAB node(s) 104, or may directly signal transmissions to a UE 115, or both. The CU 160 of the IAB donor may signal communication link establishment via an F1 interface to IAB node(s) 104, and the IAB node(s) 104 may schedule transmissions (e.g., transmissions to the UEs 115 relayed from the IAB donor) through one or more DUs (e.g., DUs 165). That is, data may be relayed to and from IAB node(s) 104 via signaling via an NR Uu interface to MT of IAB node(s) 104 (e.g., other IAB node(s)). Communications with IAB node(s) 104 may be scheduled by a DU 165 of the IAB donor or of IAB node(s) 104.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID)). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a network entity 105 operating with lower power (e.g., a base station 140 operating with lower power) relative to a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or more cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

The wireless communications system 100 may support synchronous or asynchronous operation. For synchronous operation, network entities 105 (e.g., base stations 140) may have similar frame timings, and transmissions from different network entities (e.g., different ones of the network entities 105) may be approximately aligned in time. For asynchronous operation, network entities 105 may have different frame timings, and transmissions from different network entities (e.g., different ones of network entities 105) may, in some examples, not be aligned in time. The techniques described herein may be used for either synchronous or asynchronous operations.

Some UEs 115, such as MTC or IoT devices, may be relatively low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by a transmitting device (e.g., a network entity 105 or a UE 115) along a single beam direction (e.g., a direction associated with the receiving device, such as another network entity 105 or UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

As described herein, the network (e.g., a network entity 105) may configure a UE 115 with a first set of ROs (e.g., SBFD ROs) and a second set of ROs (e.g., HD ROs). The network entity 105 may also provide the UE 115 with information regarding whether the UE 115 is to select an RO from the first set of ROs or the second set of ROs. For example, the information may prevent the UE 115 from using SBFD ROs if an SSB RSRP (e.g., for a given beam) is less than a threshold, or may instruct the UE 115 to use an SBFD RO or the HD RO based on calculated transmit power for the respective candidate ROs. In some examples, the information may instruct the UE 115 to use an SBFD RO or a legacy RO based on a priority level of a random access message, RDB, or payload size of the random access message. In some examples, the information may instruct the UE 115 to select an SBFD RO or a legacy RO based on a use case of the random access message (e.g., initial access, two-step or four-step random access, SI-request, BFR, connection setup, among other examples). In some examples, the information may instruct the UE 115 to select the SBFD RO or the legacy RO (e.g., corresponding to a same beam) based on which RO occurs first in time. In some examples, the network entity 105 may indicate (e.g., via higher layer signaling) which of the two ROs the UE is to use. In some examples, multiple criteria may be considered in a particular order to determine which RO the UE 115 is to use.

Figure 2:
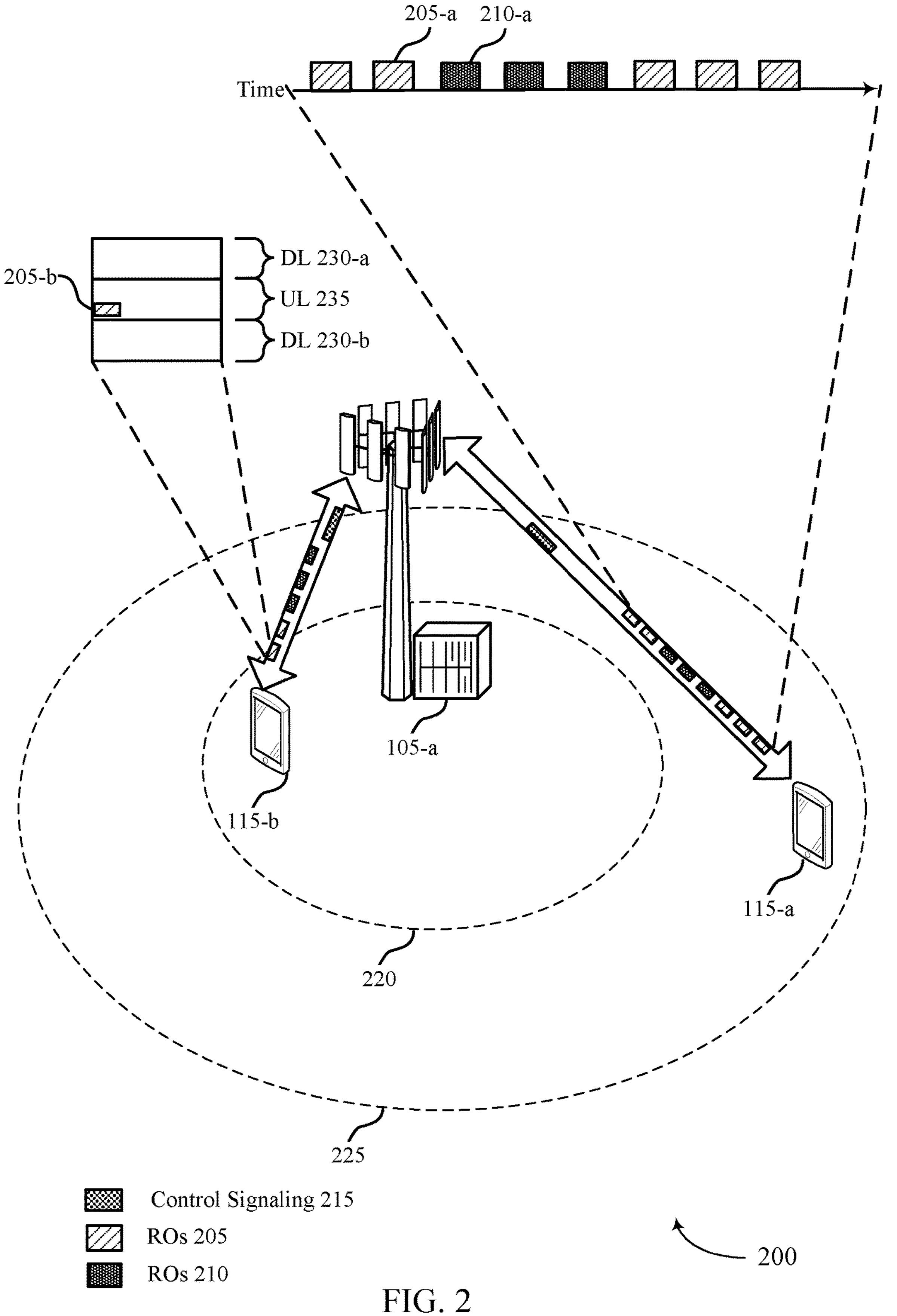
FIG. 2 shows an example of a wireless communications system that supports RO selection for SBFD capable devices in accordance with one or more aspects of the present disclosure.

FIG. 2 shows an example of a wireless communications system 200 that supports RO selection for SBFD capable devices in accordance with one or more aspects of the present disclosure. The wireless communications system 200 may implement, or be implemented by, aspects of the wireless communications system 100. For example, the wireless communications system 200 may include a network entity 105-*a*, and one or more UEs 115 (e.g., the UE 115-*a* and the UE 115-*b*), which may be examples of corresponding devices described with reference to FIG. 1.

The UEs 115 may perform random access as part of one or more wireless communication procedures (e.g., a SI request, a BFR request, a connection setup, an initial access procedure, etc.). The network entity may configure the UEs 115 with one or more ROs via which to transmit a random access message (e.g., random access message 1 or random access message 3 in a three-step random access procedure, random access message A of a two-step random access procedure).

In some examples, one or more UEs 115 may support SBFD communications, which may or may not be enabled at other UEs 115. The network may configure multiple sets of ROs for multiple duplex types (e.g., a first configuration of a first set of ROs 205 for SBFD enabled UEs 115, and a second configuration of a second set of ROs 210 for HD enabled UEs 115).

In some examples, the network entity 105-*a* may transmit configuration information (e.g., via the control signaling 215) indicating separate RACH configurations for each duplex type (e.g., a first configuration for SBFD and a second configuration for HD). One configuration (e.g., the SBFD configuration) may only be valid in SBFD slots. The two RACH configurations may result in increased clarity and decreased ambiguity because there is no reason to map SSBs to ROs across configurations. Each configuration may support random access procedures according to a separate set of parameters, which may improve performance. For example, the network entity 105-*a* may transmit control signaling including configuration information for both a first set of ROs 205 (e.g., for SBFD slots) and a second set of ROs 210 (e.g., for HD slots). The UE 115-*a* may identify ROs 205 in the first set of ROs 205 (e.g., including the RO 205-*a*) and ROs 210 in the second set of ROs 210. As described herein, the UE 115-*a* may support SBFD operations, and may therefore be capable of transmitting random access messages via the ROs 205 or the ROs 210.

In some examples, the network entity 105-*a* may transmit configuration information (e.g., via the control signaling 215) indicating a single RACH configuration for all duplex types (e.g., for SBFD and HD). A single configuration for multiple types of duplexing may result in a reduction in signaling overhead. The configuration information may define validity rules in SBFD slots. For example, the network entity 105-*a* may transmit control signaling 215 to the UE 115-*b*. The control signaling may include a single set of parameters defining multiple ROs. The UE may apply the parameters to various slots (e.g., some of which may be SBFD slots), and may then determine a first set of ROs 205 and a second set of ROs 210. For instance, the RO 205-*b* may be located in an SBFD slot 235. If SBFD communications are enabled for the SBFD slot, then the UE 115-*b* may support downlink communications via one or both of downlink resources 230-*a* and downlink resources 230-*b*, and may also support uplink communications via the uplink resources 235 (e.g., where the UL resources 235 and the downlink resources 230-*a* and the downlink resources 230-*b* are located within a single carrier). In such examples, the RO 205-*b* may be considered a valid RO, selectable by the UE 115-*b* for transmitting a random access message. However, if the slot is not enabled for SBFD, then the uplink resources 235 may not be available for uplink signaling to the UE 115-*b*. Additionally, or alternatively, the first set of ROs 205 may include ROs such as the RO 205-*b* (e.g., which is not available to a UE operating according to a HD mode because the slot 235 will be a downlink slog in such a case), and the second set of ROs 210 may be located in downlink slots (e.g., and not in SBFD slots such as the slot 235). In such examples, the UE 115-*b* may not be able to transmit the random access message via the RO 205-*b*, in which case the RO 205-*b* may not be considered a valid RO.

In some examples, as described herein, it may be beneficial for a UE 115 to select ROs from either mode (e.g., to select an RO 205 from a first set of ROs configured for SBFD, or from a second set of ROs configured for HD). However, without a mechanism to determine how and when to select ROs from different sets of ROs, random access procedures may experience increased cross-link interference (CLI), UEs 115 may experience increased latency, beam mapping to ROs may experience increased complexity resulting in increased processing expenditures or increased system latency, or any combination thereof. As described herein, selection from the first set of ROs 205 or the second set of ROs 210 may refer to selection of an RO from one of separately configured sets of ROs, or selection of an RO from two sets of ROs interpreted from a single RACH configuration.

Selection of an RO from multiple sets of ROs may support a reduction of cross-link interference (CLI). For example, the UE 115-*b* may be enabled to select a SBFD RO 210 based on its geographic location (e.g., closer to a cell center, within a coverage area 220). The transmit power of random access transmissions from the UE 115-*b* may be lower than the transmit power of the UE 115-*a* (e.g., located towards the cell edge within coverage area 225). Thus, the UE 115-*b* may be permitted to transmit random access messages via the ROs 205 (e.g., in a SBFD mode), but the UE 115-*a* may be restricted to transmitting random access messages via one of the ROs 210 (e.g., in HD mode). Selection of an RO from multiple sets of ROs may support regulation, by the network, of a trade-off between transmission power on ROs and CLI. Further, ROs of SBFD ROs 205 may be used when latency is particularly relevant (e.g., high priority signaling, RDBs, or the like). For instance, at a given point in time, a next RO available to the UE 115-*a* may be the RO 205-*a*. For some high priority scenarios, the UE 115-*a* may be permitted to transmit an RO 205-*a* in SBFD mode (e.g., despite the location of the UE 115-*a* and potential CLI) instead of waiting for a next available HD RO 210-*a*.

As described herein, the UE 115-*a* may select an RO to use for transmitting a random access message from a configured set of ROs (e.g., the first set of SBFD ROs 205 or the second set of HD ROs 210. The first set of ROs 205 and the second set of ROs 210 may be separately configured, or may be determined by the UE 115 (e.g., based on one or more rules, based on whether one or more ROs 205 are considered valid in a given slot, based on one or more rules or conditions, among other examples).

In some examples, the UE 115 may select and use an SBFD RO 205 if one or more measurements (e.g., SSB-RSRP) is less than a threshold, as described in greater detail with reference to FIG. 3.

In some examples, the network entity 105-*a* may instruct a UE 115 to use one of the two types of ROs based on a calculated transmit power in each case. For example, the network entity 105-*a* may indicate (e.g., to the UE 115 via the control signaling 215) a threshold transmit power to be used or SBFD-dedicated RACH configurations (e.g., for SBFD ROs 205). If the UE 115-*a* has two candidate ROs available, one HD and one SBFD-dedicated (e.g., the RO 205-*a* and the RO 210-*a*), then the UE 115-*b* may calculate the uplink power for each of the candidate ROs (e.g., a first transmit power if the UE 115-*a* transmits a random access message via the RO 205-*a*, and a second transmit power if the UE 115-*b* transmits the random access message via the RO 210-*a*). If the calculated uplink transmission power in the SBFD RO 205-*a* exceeds the threshold indicated in the control signaling 215, then the UE 115-*a* may refrain from transmitting the random access message via the SBFD RO 205-*a* (e.g., and may instead transmit the random access message via the HD RO 210-*a*). Using the threshold transmit power to determine whether to transmit via the SBFD ROs 205 may result in reduced CLI. For instance, the UE 115-*b* (e.g., located closer to the cell center) may determine that the calculated transmit power for an SBFD RO 205 satisfies the threshold, and may transmit the random access message via a selected SBFD RO 205 (e.g., the SBFD RO 205-*b*). However, the UE 115-*a* (e.g., located further from the cell center) may determine that the calculated transmit power for an SBFD RO 205 does not satisfy the threshold (e.g., exceeds the threshold transmit power), and may refrain from transmitting the random access message via an SBFD RO 205 based thereon.

The threshold transmit power may be indicated via the control signaling 215. The control signaling carrying the threshold transmit power may be system information (e.g., system information block (SIB)), or may be higher layer signaling (e.g., RRC configuration). In some examples, each beam or each SB index may be configured with its own threshold transmit power (e.g., resulting in more granular control over the coverage area and more specific management of CLI). For instance, in some examples (e.g., low traffic times or low traffic areas, high channel quality, etc.), the network may configure the UE 115-*a* with a high transmit power threshold (e.g., permitting the UE 115-*a* to transmit via the SBFD ROs 205 more often) for a given beam pointed toward the UE 115-*a*. The threshold transmit power may be a function of a frequency allocation of a given RO (e.g., because more CLI may be caused by ROs closer to a downlink subband). For instance, the transmit threshold power for a given beam or for a given RO 205-*b* may be higher if the RO 205-*b* is located closer to the boundary of the downlink resources 230-*b* (e.g., and may be lower if the RO 205-*b* is located closer to the center of the uplink resources 235).

In some examples, the network entity 105-*a* may instruct the UE 115 to use one of the two types of ROs for a random access message based on a priority level of the random access message, an RDB, or a payload of the random access message. For example, the UE 115-*a* may be configured to be able to use the SBFD ROs 205 if a priority level of a signal (e.g., message 3 of a four-step random access procedure) is high (e.g., satisfies a priority threshold or is one of a subset of supported priority levels). The threshold priority level may be indicated in the control signaling 215. In some examples, the UE 115-*a* may be configured to be able to use the SBFD ROs 205 if the RDB of an uplink package satisfies (e.g., is above) a threshold. The threshold RDB may be indicated in the control signaling 215. In some examples, the UE may use the SBFD ROs 205 if a payload of a random access message (e.g., message 3 of a four-step random access procedure) satisfies (e.g., is greater than or smaller than) a given threshold. The threshold may be indicated in the control signaling 215. For example, the UE may use an SBFD RO 205 for transmitting a random access message if a payload is smaller than a threshold (e.g., in the case of a message 3 of a four-step random access procedure). In some examples, the control signaling 215 may indicate to the UE 115-*a* that the UE 115-*a* is to use the SBFD ROs 205 if a payload of the random access message (e.g., message 3 of a four-step random access procedure) is higher than a threshold. In such examples, use of the SBFD ROs 205 for random access messages may implicitly indicate to the network entity 105-*a* that more resources should be assigned to the UE 115-*a* (e.g., for subsequent signaling).

In some examples, the UE may select and use one of the two types of ROs based on a use case of a random access message (e.g., such as an SI-request, a BFR, a connection setup, an initial access procedure, etc.). For example, the control signaling 215 may indicate, to each UE 115, whether to use SBFD ROs 205 for each of multiple use cases. For instance, the UE 115 may select either ROs 205 or ROs 210 for a four-step random access procedure, but may only use ROs 210 for two-step random access procedures. The UE 115 may be instructed to use SBFD ROs 205 (e.g., and not ROs 210) for BFRs. Thus, depending on the contents of a random-access message or the use case for transmitting the random access message, the UE 115 may determine which ROs it is permitted to use.

In some examples, the UE may select and use one of the two types of ROs based on a timing of a first available RO for a corresponding measured beam (e.g., may select whichever of the two types of ROs occurs sooner for a given beam). For instance, at a point in time prior to the SBFD RO 205-*a*, the UE 115-*a* may determine which RO occurs first in time. If both the RO 205-*a* and the RO 210-*a* correspond to a same beam (e.g., a same SSB), then the UE 115-*a* may determine whether to use the SBFD RO 205-*a* or the HD RO 210-*a* based on timing. For example, as the SBFD RO 205-*a* occurs first in time (e.g., the next available RO for the corresponding beam), the UE 115-*a* may transmit the random access message via the SBFD RO 205-*a*. Similarly (e.g., at a point in time occurring after the RO 205-*a*), if the UE 115-*a* determines that a next available RO for a given beam is the RO 210-*a*, then the UE 115-*a* may transmit the random access message via the RO 210-*a*.

In some examples, various criteria described herein may be utilized in combination (e.g., in a specific order). A UE 115 may apply one or more of the selection criteria in a given order (e.g., which may be indicated via the control signaling 215. For instance, the UE 115-*a* may first measure an RSRP of each SSB and determine whether the RSRP satisfies a threshold. Based on the measurements, the UE 115-*a* may determine that both the RO 205-*a* and the RO 210-*a* are available for selection and use. Next, the UE 115-*a* may calculate a transmit power for each of the RO 205-*a* and the RO 210-*a*. If one of the ROs does not satisfy the transmit power threshold, then the UE 115-*a* may transmit the random access message via the other RO. If both ROs satisfy the transmit power, then the UE 115-*a* may address another selection criteria (e.g., determine a timing of the two ROs, or a priority level of the random access message, among other criteria), or may autonomously select a preferred RO of the candidate ROs. In some examples, the order of the various criteria may be defined or predefined in one or more rules, or may be indicated in the control signaling 215.

In some examples, the control signaling 215 may include an explicit indication of which set of ROs the UE 115 is to use. The UE 115 may then select an RO 205 or an RO 210 for a random access message based on the explicit instruction. In some examples, the UE 115 may select SBFD ROs 205 (e.g., and not to select ROs 210 in any scenario) according to one or more rules or as instructed in the control signaling 215.

The control signaling 215 may carry an indication of one or more selection criteria, rules, or conditions, including thresholds based on which the UE 115 may select which RO to use. The control signaling 215 may be system information (e.g., SIB), higher layer signaling (e.g., RRC signaling), or dynamic signaling, among other examples.

Each UE 115 may be configured with the first set of ROs 205 and the second set of ROs 210. Each UE 115 may then receive control signaling 215 which indicates parameters, or instructions, order of criteria, or any combination thereof. Having selected an RO 205 or an RO 210, the UE 115 may transmit a random access message via the selected RO.

Figure 3:
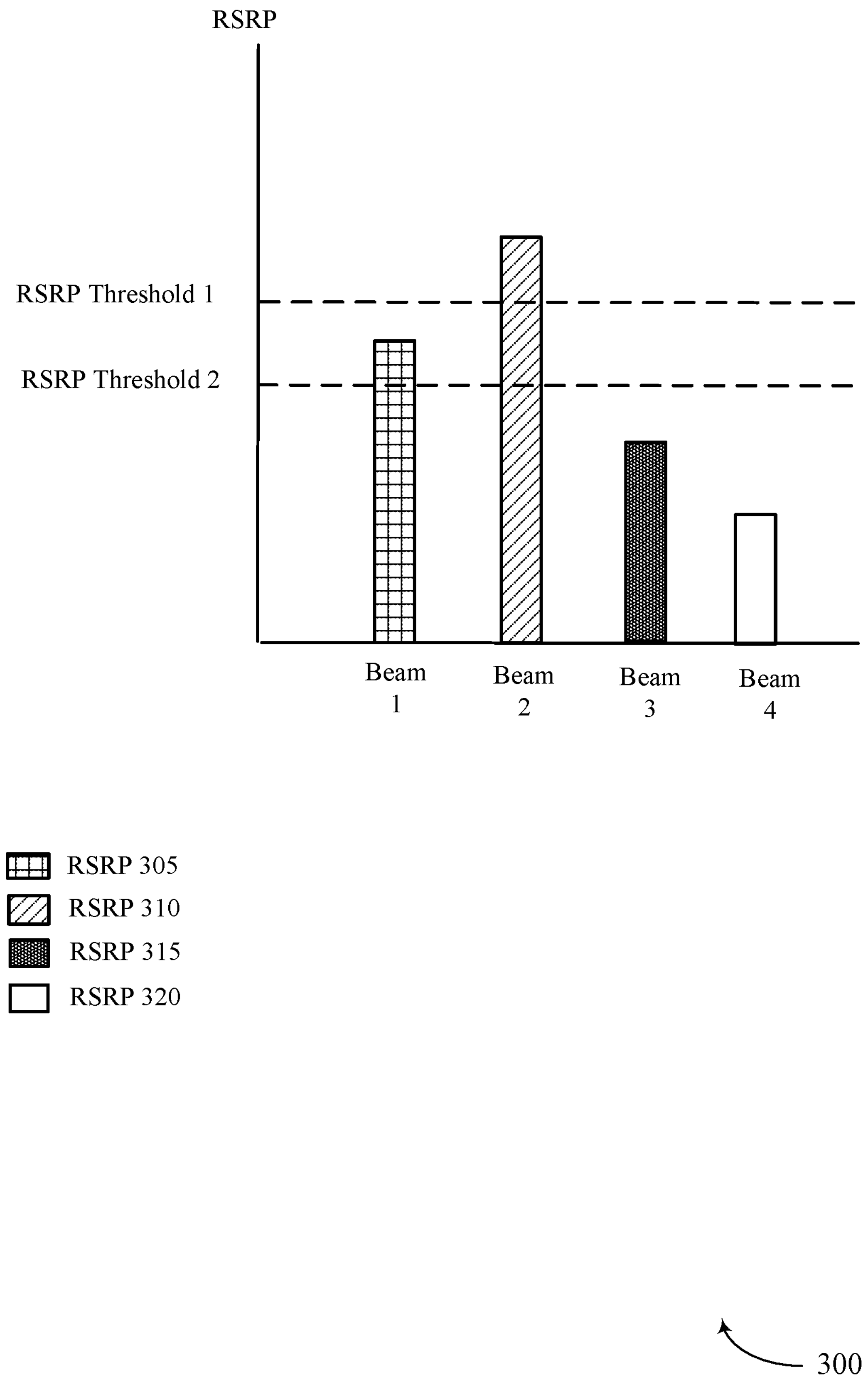
FIG. 3 shows an example of a RO selection scheme that supports RO selection for SBFD capable devices in accordance with one or more aspects of the present disclosure.

FIG. 3 shows an example of an RO selection scheme 300 that supports RO selection for SBFD capable devices in accordance with one or more aspects of the present disclosure. The RO selection scheme 300 may implement, or be implemented by, aspects of the wireless communications system 100, and the wireless communications system 200. For example, a network entity and a UE, which may be examples of corresponding devices described with reference to FIGS. 1-2, may communicate with each other according to the RO selection scheme 300.

In some examples, as described in greater detail with reference to FIG. 2, a UE may be configured with multiple sets of ROs. The sets of ROs may be configured as a single configuration from which the UE determines the sets of ROs, or may be separately configured. The UE may measure one or more beams (e.g., may monitor for and receive one or more SSBs via the one or more beams). The measurements may be, for example, an RSRP for each beam (e.g., a set of SSB-RSRPs for a set of beams). For instance, the UE may receive four SSBs via four beams (e.g., beam 1, beam 2, beam 3, and beam 4). The UE may measure an RSRP for each beam (e.g., RSRP 305 for beam 1, RSRP 310 for beam 2, RSRP 315 for beam 3, and RSRP 320 for beam 4).

The UE may be indicated (e.g., via control signaling 215) an RSRP threshold (e.g., rsrp-ThresholdSSB_SBFD). If a measurement RSRP from an SSB is less than the threshold, then the UE may not be permitted to transmit random access signaling via the corresponding beam using SBFD ROs. For instance, the network entity may indicate, to the UE, the RSRP threshold 1. RSRP 310 of beam 2 may satisfy the RSRP threshold 1, in which case the UE may transmit a random access message via an SBFD RO corresponding to the beam 2. However, RSRP 305, RSRP 315, and RSRP 320, may not satisfy the RSRP threshold 1. In such examples, the UE may not select an SBFD RO corresponding to beam 1, beam 3, or beam 4 (e.g., may transmit random access messages via HD ROs corresponding to beam 1, beam 3, or beam 4, or may not transmit anything via beam 1, beam 2, or beam 4 based on the RSP threshold 1).

In some examples, the UE may be configured with two thresholds. For instance, the network entity may indicate a first RSRP threshold 1 (e.g., for determining whether to select an SBFD RO or a HD RO), and a second RSRP threshold 2 (e.g., for determining whether a beam is useable for subsequent communication). The RSRP 305 may satisfy the RSRP threshold 2, but not the RSRP threshold 1. The RSRP 310 may satisfy both the RSRP threshold 1 and the RSRP threshold 2. The RSRP 315 and the RSRP 320 may not satisfy either of the RSRP threshold 2 or the RSRP threshold 1. In such examples, the UE may transmit random access messages via either the SBFD RO or the HD RO using the beam 2, but may transmit a random access message via the HD RO (e.g., and not the SBFD RO) using the beam 1. The UE may not use the beam 3 or the beam 4 for transmitting any random access signaling based on the RSRP 315 an the RSRP 320 failing to satisfy the RSRP threshold 2.

Figure 4:
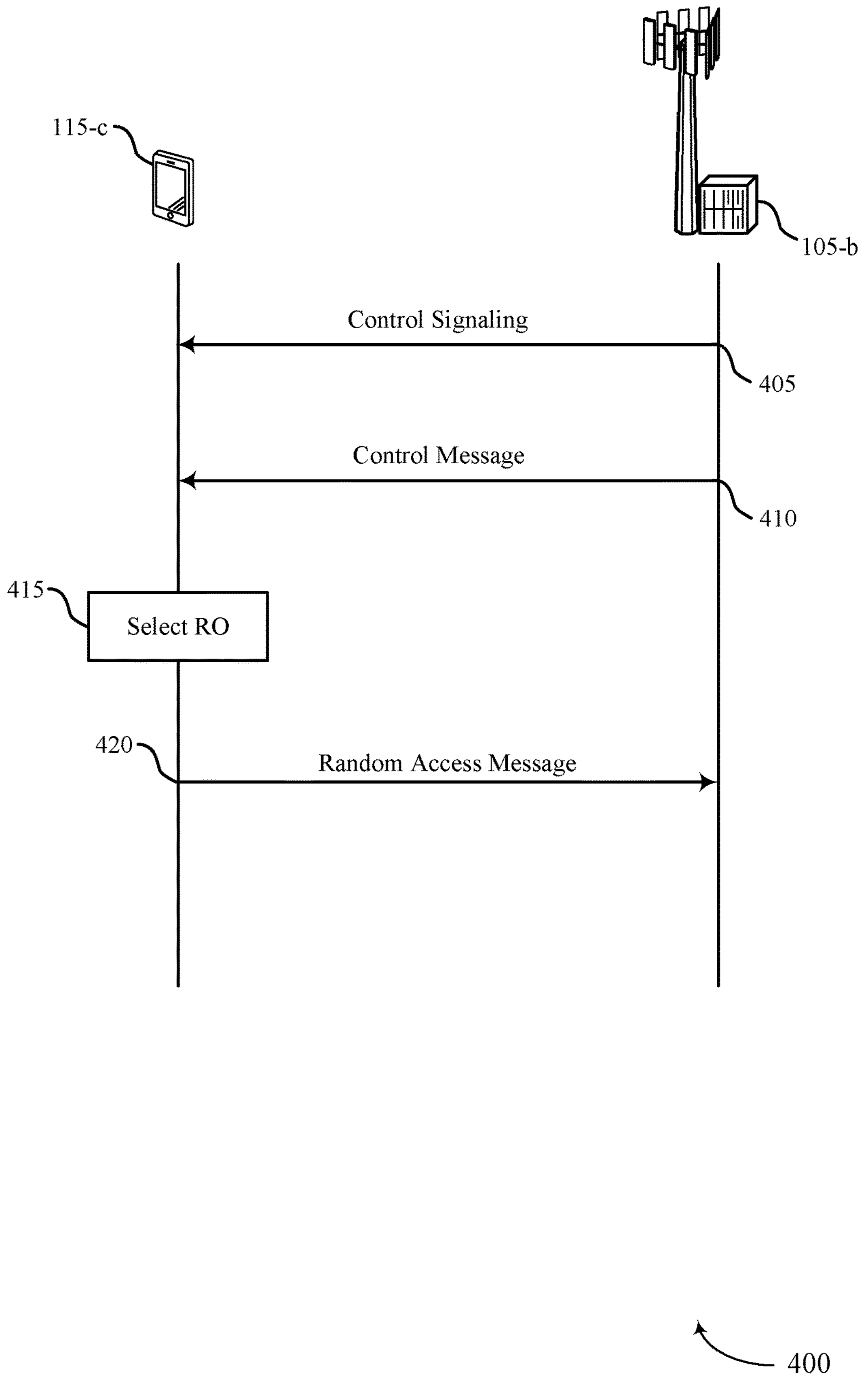
FIG. 4 shows an example of a process flow that supports RO selection for SBFD capable devices in accordance with one or more aspects of the present disclosure.

FIG. 4 shows an example of a process flow 400 that supports RO selection for SBFD capable devices in accordance with one or more aspects of the present disclosure. The process flow 400 may implement, or be implemented by, aspects of the wireless communications system 100, the wireless communications system 200, or the RO selection scheme. For example, the process flow 400 may include a network entity 105-*b*, and a UE 115-*c*, which may be examples of corresponding devices described with reference to FIGS. 1-3.

At 405, the UE 115-*c* may receive (e.g., from the network entity 105-*b*) control signaling indicating a first set of ROs corresponding to a full duplex mode of operation (SBFD ROs) and a second set of ROs associated with a HD mode of operation (HD ROs).

At 410, the UE 115-*c* may receive (e.g., from the network entity 105-*b*) a control message including information associated with a determination of whether to use an RO from the first set of ROs or from the second set of ROs. The control message may be a SIB, or an RRC message, among other examples.

At 415, the UE 115-*c* may select an RO from the first set of ROs, or from the second set of ROs, based on the information received via the control message at 410.

In some examples, the UE 115-*c* may receive SBs via multiple beams (e.g., a first beam corresponding to one or more candidate ROs including the first RO). The UE 115-*c* may perform an RSRP measurement for reach respective beam, and selecting the first RO may be based on a first RSRP for the first beam satisfying a first threshold value corresponding to the SBFD mode (the RSRP threshold, as described in greater detail with reference to FIG. 3). In some examples, the information received in the control message at 410 may include an indication of the first threshold value. The information may include multiple threshold values including the first threshold value, each threshold value of the multiple threshold values corresponding to a respective beam of the multiple beams (e.g., one RSRP threshold for each measured beam).

In some examples, the UE 115-*c* may select the RO at 415 based on transmit powers for each candidate RO. For example, the UE 115-*c* may calculate a first transmit power corresponding to a first candidate RO of the first set of ROs and a second transmit power corresponding to a second candidate RO of the second set of ROs. Selecting the first RO may be based at least in part on the first transmit power or the second transmit power satisfying a transmit power threshold. In some examples, the information in the control message may include an indication of the transmit power threshold. In some examples, the information may include multiple transmit power thresholds for each of a set of measured beams. In some examples, the transmit power threshold may be based at least in part on a frequency resource of the first RO (e.g., may be higher for ROs that are located closer to downlink resources, than for ROs that are located farther away from downlink resources, as described in greater detail with reference to FIG. 2).

In some examples, selecting the first RO may be based on whether a priority level of the random access message satisfies a priority level threshold, a RDB corresponding to an uplink package including the random access message satisfies a RDB threshold, a size of a payload of the random access message satisfies a payload size threshold, or any combination thereof. The information received in the control message may include an indication of the priority level threshold, the RDB threshold, the payload size threshold, or a combination thereof.

In some examples, selecting the first RO may be based on a type of the random access message. The type of the random access message may include a message in a two-step random access procedure, a message in a four-step random access procedure, an SI request, a BFR request, or a connection setup message, among other examples. In some examples, the information received at 410 may include an indication of whether the UE is to select the first RO from the first set of ROs or from the second set of ROs for each type of the random access message.

In some examples, selecting the first RO is based at least in part on the first RO of the first set of ROs occurring prior to a candidate RO of the second set of ROs.

In some examples, the control message may include an RRC message indicating the first set of ROs or the second set of ROs, and selecting the first RO may be based on the RRC message.

At 420, the UE 115-*c* may transmit a random access message (e.g., to the network entity 105-*b*) via a first RO that is selected (e.g., at 415) based on the information received at 410 from the first RO and the second RO.

Figure 5:
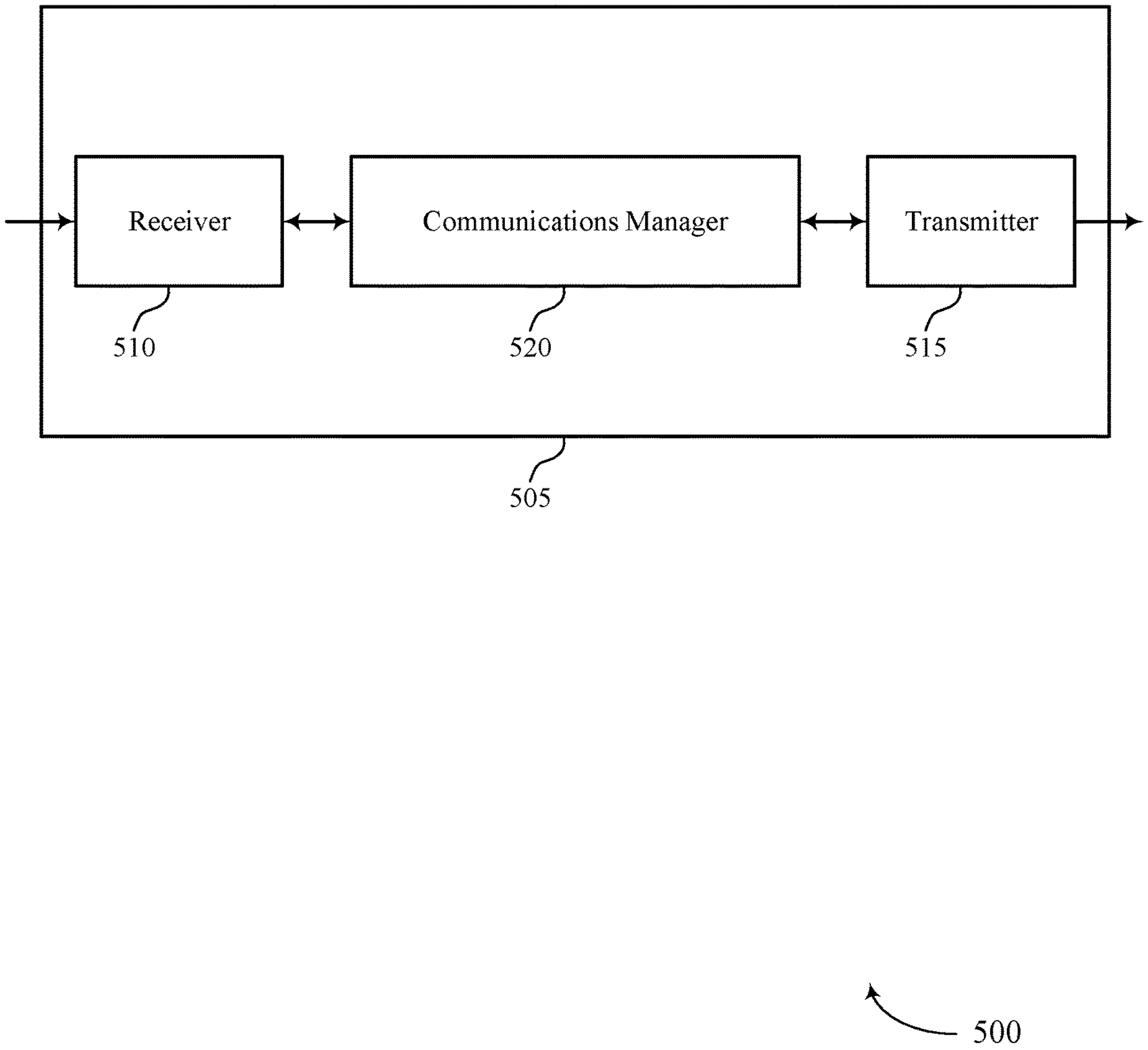
FIGS. 5 and 6 show block diagrams of devices that support RO selection for SBFD capable devices in accordance with one or more aspects of the present disclosure.

FIG. 5 shows a block diagram 500 of a device 505 that supports RO selection for SBFD capable devices in accordance with one or more aspects of the present disclosure. The device 505 may be an example of aspects of a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor, which may be coupled with at least one memory, to, individually or collectively, support or enable the described techniques. Each of these components may be in communication with one another (e.g., via one or more buses).

The receiver 510 may provide a means for receiving information such as packets, user data, control information, or any combination thereof associated with various information channels (e.g., control channels, data channels, information channels related to RO selection for SBFD capable devices). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to RO selection for SBFD capable devices). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations or components thereof may be examples of means for performing various aspects of RO selection for SBFD capable devices as described herein. For example, the communications manager 520, the receiver 510, the transmitter 515, or various combinations or components thereof may be capable of performing one or more of the functions described herein.

In some examples, the communications manager 520, the receiver 510, the transmitter 515, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 520, the receiver 510, the transmitter 515, or various combinations or components thereof may be implemented in code (e.g., as communications management software or firmware) executed by at least one processor (e.g., referred to as a processor-executable code). If implemented in code executed by at least one processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications in accordance with examples as disclosed herein. For example, the communications manager 520 is capable of, configured to, or operable to support a means for receiving control signaling indicating a first set of ROs corresponding to a full duplex mode of operation and a second set of ROs associated with a HD mode of operation. The communications manager 520 is capable of, configured to, or operable to support a means for receiving a control message including information associated with a determination of whether to select a RO from the first set of ROs or from the second set of ROs. The communications manager 520 is capable of, configured to, or operable to support a means for transmitting a random access message via a first RO that is selected, based on the information, from the first set of ROs or from the second set of ROs.

By including or configuring the communications manager 520 in accordance with examples as described herein, the device 505 (e.g., at least one processor controlling or otherwise coupled with the receiver 510, the transmitter 515, the communications manager 520, or a combination thereof) may support techniques for RO selection resulting in reduced processing, more efficiency utilization of system resources, decreased latency, reduced CLI, and increased reliability of wireless communications.

Figure 6:
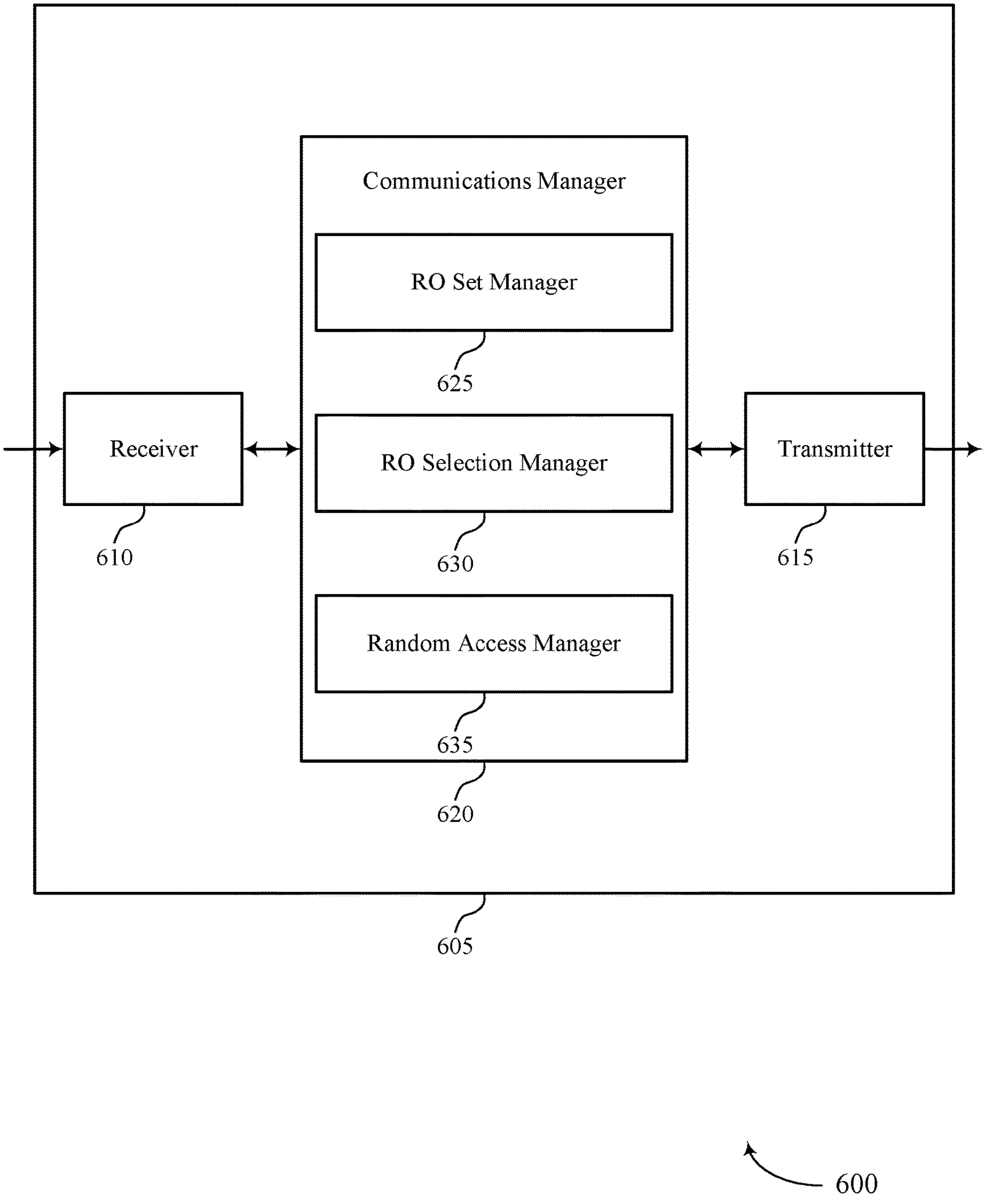

FIG. 6 shows a block diagram 600 of a device 605 that supports RO selection for SBFD capable devices in accordance with one or more aspects of the present disclosure. The device 605 may be an example of aspects of a device 505 or a UE 115 as described herein. The device 605 may include a receiver 610, a transmitter 615, and a communications manager 620. The device 605, or one of more components of the device 605 (e.g., the receiver 610, the transmitter 615, the communications manager 620), may include at least one processor, which may be coupled with at least one memory, to support the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to RO selection for SBFD capable devices). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to RO selection for SBFD capable devices). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of RO selection for SBFD capable devices as described herein. For example, the communications manager 620 may include a RO set manager 625, a RO selection manager 630, a random access manager 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. The RO set manager 625 is capable of, configured to, or operable to support a means for receiving control signaling indicating a first set of ROs corresponding to a full duplex mode of operation and a second set of ROs associated with a HD mode of operation. The RO selection manager 630 is capable of, configured to, or operable to support a means for receiving a control message including information associated with a determination of whether to select a RO from the first set of ROs or from the second set of ROs. The random access manager 635 is capable of, configured to, or operable to support a means for transmitting a random access message via a first RO that is selected, based on the information, from the first set of ROs or from the second set of ROs.

Figure 7:
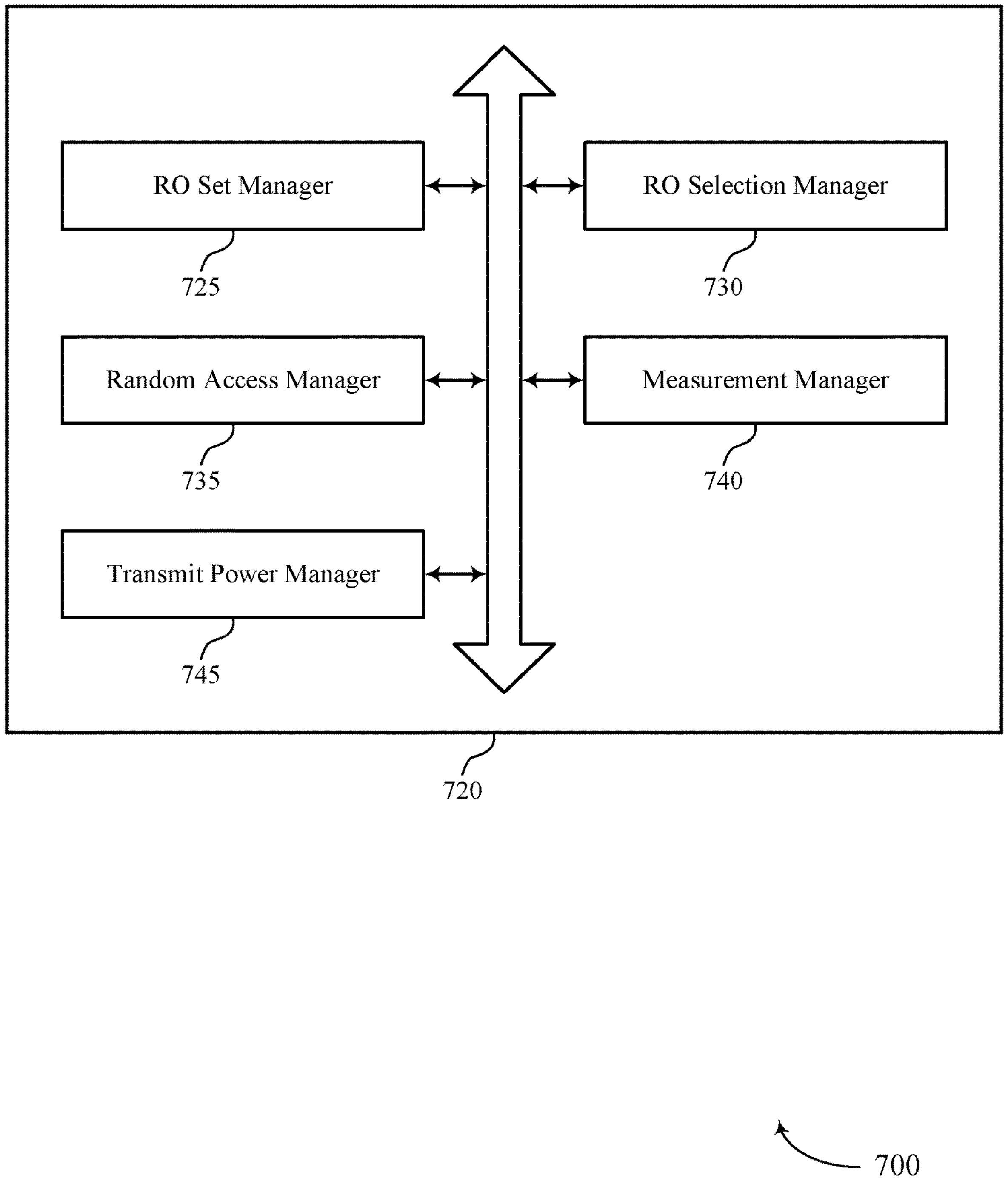
FIG. 7 shows a block diagram of a communications manager that supports RO selection for SBFD capable devices in accordance with one or more aspects of the present disclosure.

FIG. 7 shows a block diagram 700 of a communications manager 720 that supports RO selection for SBFD capable devices in accordance with one or more aspects of the present disclosure. The communications manager 720 may be an example of aspects of a communications manager 520, a communications manager 620, or both, as described herein. The communications manager 720, or various components thereof, may be an example of means for performing various aspects of RO selection for SBFD capable devices as described herein. For example, the communications manager 720 may include a RO set manager 725, a RO selection manager 730, a random access manager 735, a measurement manager 740, a transmit power manager 745, or any combination thereof. Each of these components, or components or subcomponents thereof (e.g., one or more processors, one or more memories), may communicate, directly or indirectly, with one another (e.g., via one or more buses).

The communications manager 720 may support wireless communications in accordance with examples as disclosed herein. The RO set manager 725 is capable of, configured to, or operable to support a means for receiving control signaling indicating a first set of ROs corresponding to a full duplex mode of operation and a second set of ROs associated with a HD mode of operation. The RO selection manager 730 is capable of, configured to, or operable to support a means for receiving a control message including information associated with a determination of whether to select a RO from the first set of ROs or from the second set of ROs. The random access manager 735 is capable of, configured to, or operable to support a means for transmitting a random access message via a first RO that is selected, based on the information, from the first set of ROs or from the second set of ROs.

In some examples, the measurement manager 740 is capable of, configured to, or operable to support a means for receiving a set of multiple synchronization signal block signals via a set of multiple beams, where a first beam of the set of multiple beams corresponds to the first RO. In some examples, the measurement manager 740 is capable of, configured to, or operable to support a means for performing a reference signal receive power measurement for each respective beam of the set of multiple beams, where selecting the first RO is based on a first reference signal receive power measurement of at least the first beam satisfying a first threshold value corresponding to a SBFD mode.

In some examples, the information includes an indication of the first threshold value corresponding to the SBFD mode.

In some examples, the information includes a set of multiple threshold values including the first threshold value, each threshold value of the set of multiple threshold values corresponding to a respective beam of the set of multiple beams.

In some examples, the information includes a set of multiple threshold values including the first threshold value, each threshold value of the set of multiple threshold values corresponding to a type of random access transmission. In some examples, selecting the first RO is based on the random access message corresponding to a first type of random access transmission associated with the first threshold value.

In some examples, the transmit power manager 745 is capable of, configured to, or operable to support a means for calculating a first transmit power corresponding to a first candidate RO of the first set of ROs and a second transmit power corresponding to a second candidate RO of the second set of ROs, where the first RO includes either the first candidate RO or the second candidate RO, and where the selecting is based on the first transmit power or the second transmit power satisfying a transmit power threshold.

In some examples, the information includes an indication of the transmit power threshold.

In some examples, the information includes a set of multiple transmit power thresholds including the transmit power threshold, each transmit power threshold of the set of multiple transmit power thresholds corresponding to a respective beam of a set of multiple beams.

In some examples, the transmit power threshold is based on a frequency resource of the first RO.

In some examples, selecting the first RO is based on whether a priority level of the random access message satisfies a priority level threshold, a remaining delay budget corresponding to an uplink package including the random access message satisfies a remaining delay budget threshold, a size of a payload of the random access message satisfies a payload size threshold, or any combination thereof.

In some examples, the information includes an indication of the priority level threshold, the remaining delay budget threshold, the payload size threshold, or any combination thereof.

In some examples, selecting the first RO is based on a type of the random access message. In some examples, the type of the random access message includes a message in a two-step random access procedure, a message in a four-step random access procedure, a system information request, a beam failure recovery request, or a connection setup message.

In some examples, the information includes an indication of whether the UE is to select the first RO from the first set of ROs or from the second set of ROs for each type of the random access message.

In some examples, selecting the first RO is based on the first RO of the first set of ROs occurring prior to a candidate RO of the second set of ROs.

In some examples, the control message includes a radio resource control message indicating the first set of ROs or the second set of ROs. In some examples, selecting the first RO is based on the radio resource control message.

Figure 8:
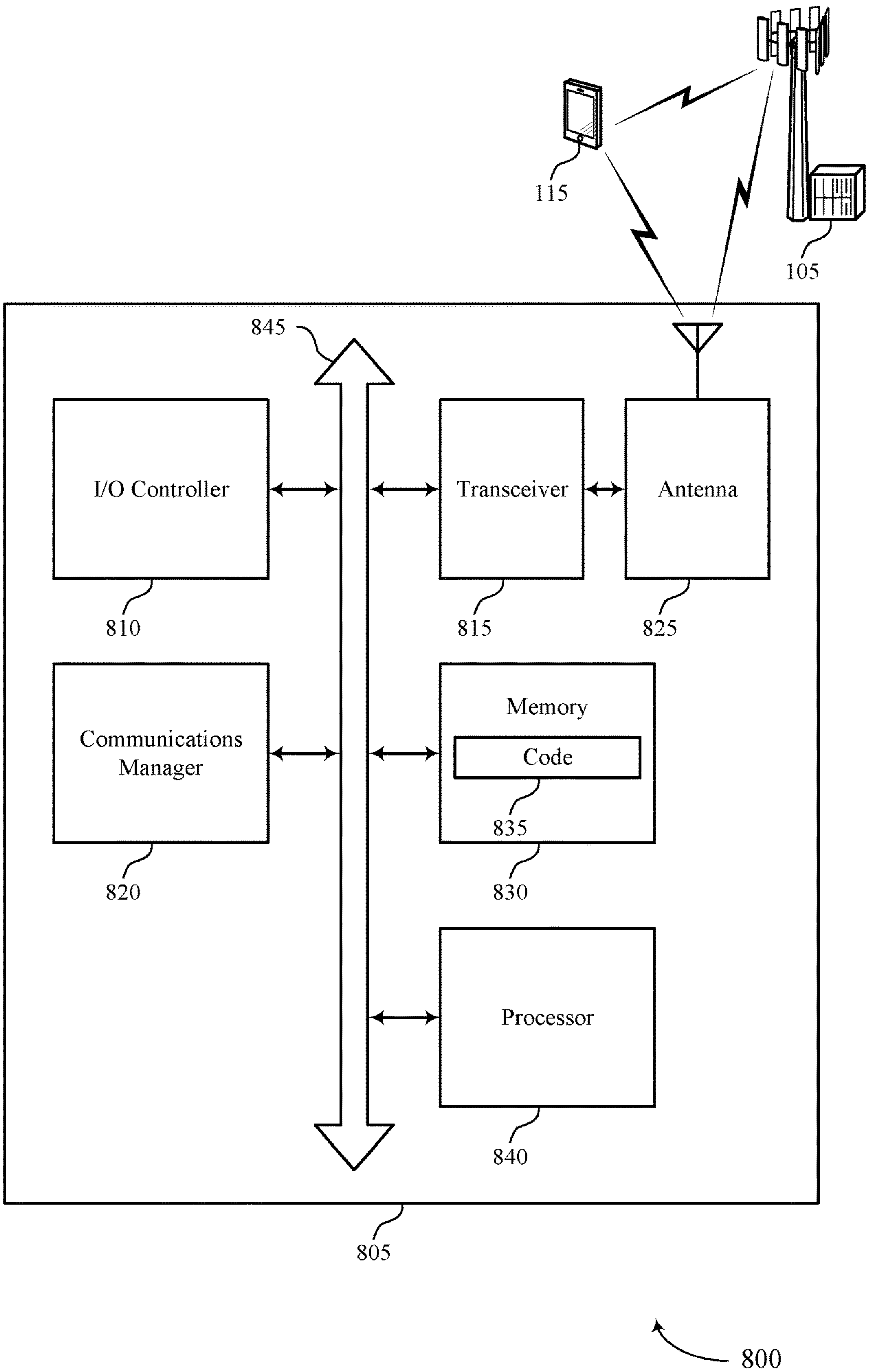
FIG. 8 shows a diagram of a system including a device that supports RO selection for SBFD capable devices in accordance with one or more aspects of the present disclosure.

FIG. 8 shows a diagram of a system 800 including a device 805 that supports RO selection for SBFD capable devices in accordance with one or more aspects of the present disclosure. The device 805 may be an example of or include components of a device 505, a device 605, or a UE 115 as described herein. The device 805 may communicate (e.g., wirelessly) with one or more other devices (e.g., network entities 105, UEs 115, or a combination thereof). The device 805 may include components for bi-directional voice and data communications including components for transmitting and receiving communications, such as a communications manager 820, an input/output (I/O) controller, such as an I/O controller 810, a transceiver 815, one or more antennas 825, at least one memory 830, code 835, and at least one processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of one or more processors, such as the at least one processor 840. In some cases, a user may interact with the device 805 via the I/O controller 810 or via hardware components controlled by the I/O controller 810.

In some cases, the device 805 may include a single antenna. However, in some other cases, the device 805 may have more than one antenna, which may be capable of concurrently transmitting or receiving multiple wireless transmissions. The transceiver 815 may communicate bi-directionally via the one or more antennas 825 using wired or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The at least one memory 830 may include random access memory (RAM) and read-only memory (ROM). The at least one memory 830 may store computer-readable, computer-executable, or processor-executable code, such as the code 835. The code 835 may include instructions that, when executed by the at least one processor 840, cause the device 805 to perform various functions described herein. The code 835 may be stored in a non-transitory computer-readable medium such as system memory or another type of memory. In some cases, the code 835 may not be directly executable by the at least one processor 840 but may cause a computer (e.g., when compiled and executed) to perform functions described herein. In some cases, the at least one memory 830 may include, among other things, a basic I/O system (BIOS) which may control basic hardware or software operation such as the interaction with peripheral components or devices.

The at least one processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 840 may be configured to operate a memory array using a memory controller. In some other cases, a memory controller may be integrated into the at least one processor 840. The at least one processor 840 may be configured to execute computer-readable instructions stored in a memory (e.g., the at least one memory 830) to cause the device 805 to perform various functions (e.g., functions or tasks supporting RO selection for SBFD capable devices). For example, the device 805 or a component of the device 805 may include at least one processor 840 and at least one memory 830 coupled with or to the at least one processor 840, the at least one processor 840 and the at least one memory 830 configured to perform various functions described herein. In some examples, the at least one processor 840 may include multiple processors and the at least one memory 830 may include multiple memories. One or more of the multiple processors may be coupled with one or more of the multiple memories, which may, individually or collectively, be configured to perform various functions described herein. In some examples, the at least one processor 840 may be a component of a processing system, which may refer to a system (such as a series) of machines, circuitry (including, for example, one or both of processor circuitry (which may include the at least one processor 840) and memory circuitry (which may include the at least one memory 830)), or components, that receives or obtains inputs and processes the inputs to produce, generate, or obtain a set of outputs. The processing system may be configured to perform one or more of the functions described herein. For example, the at least one processor 840 or a processing system including the at least one processor 840 may be configured to, configurable to, or operable to cause the device 805 to perform one or more of the functions described herein. Further, as described herein, being "configured to," being "configurable to," and being "operable to" may be used interchangeably and may be associated with a capability, when executing code 835 (e.g., processor-executable code) stored in the at least one memory 830 or otherwise, to perform one or more of the functions described herein.

The communications manager 820 may support wireless communications in accordance with examples as disclosed herein. For example, the communications manager 820 is capable of, configured to, or operable to support a means for receiving control signaling indicating a first set of ROs corresponding to a full duplex mode of operation and a second set of ROs associated with a HD mode of operation. The communications manager 820 is capable of, configured to, or operable to support a means for receiving a control message including information associated with a determination of whether to select a RO from the first set of ROs or from the second set of ROs. The communications manager 820 is capable of, configured to, or operable to support a means for transmitting a random access message via a first RO that is selected, based on the information, from the first set of ROs or from the second set of ROs.

By including or configuring the communications manager 820 in accordance with examples as described herein, the device 805 may support techniques for RO selection resulting in reduced processing, more efficiency utilization of system resources, decreased latency, reduced CLI, increased reliability of wireless communications, and improved user experience.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the at least one processor 840, the at least one memory 830, the code 835, or any combination thereof. For example, the code 835 may include instructions executable by the at least one processor 840 to cause the device 805 to perform various aspects of RO selection for SBFD capable devices as described herein, or the at least one processor 840 and the at least one memory 830 may be otherwise configured to, individually or collectively, perform or support such operations.

Figure 9:
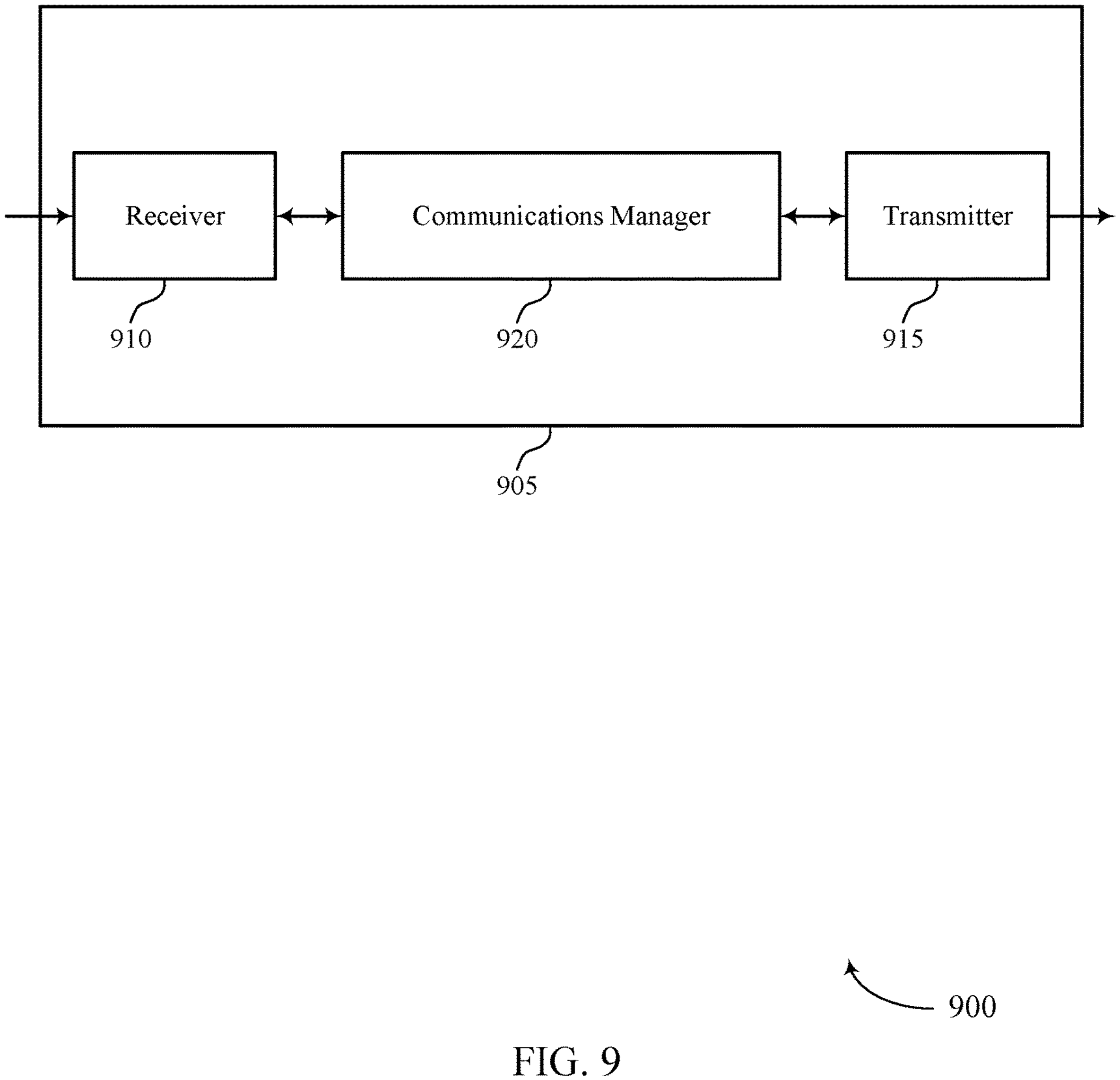
FIGS. 9 and 10 show block diagrams of devices that support RO selection for SBFD capable devices in accordance with one or more aspects of the present disclosure.

FIG. 9 shows a block diagram 900 of a device 905 that supports RO selection for SBFD capable devices in accordance with one or more aspects of the present disclosure. The device 905 may be an example of aspects of a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor, which may be coupled with at least one memory, to, individually or collectively, support or enable the described techniques. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations or components thereof may be examples of means for performing various aspects of RO selection for SBFD capable devices as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor (e.g., referred to as a processor-executable code). If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. For example, the communications manager 920 is capable of, configured to, or operable to support a means for outputting control signaling indicating a first set of ROs corresponding to a full duplex mode of operation and a second set of ROs associated with a HD mode of operation. The communications manager 920 is capable of, configured to, or operable to support a means for outputting a control message including information associated with a determination of whether to use a RO from the first set of ROs or from the second set of ROs. The communications manager 920 is capable of, configured to, or operable to support a means for obtaining a random access message via a first RO of the first set of ROs or the second set of ROs based on outputting the control message including the information.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for RO selection resulting in reduced processing, more efficiency utilization of system resources, decreased latency, reduced CLI, and increased reliability of wireless communications.

Figure 10:
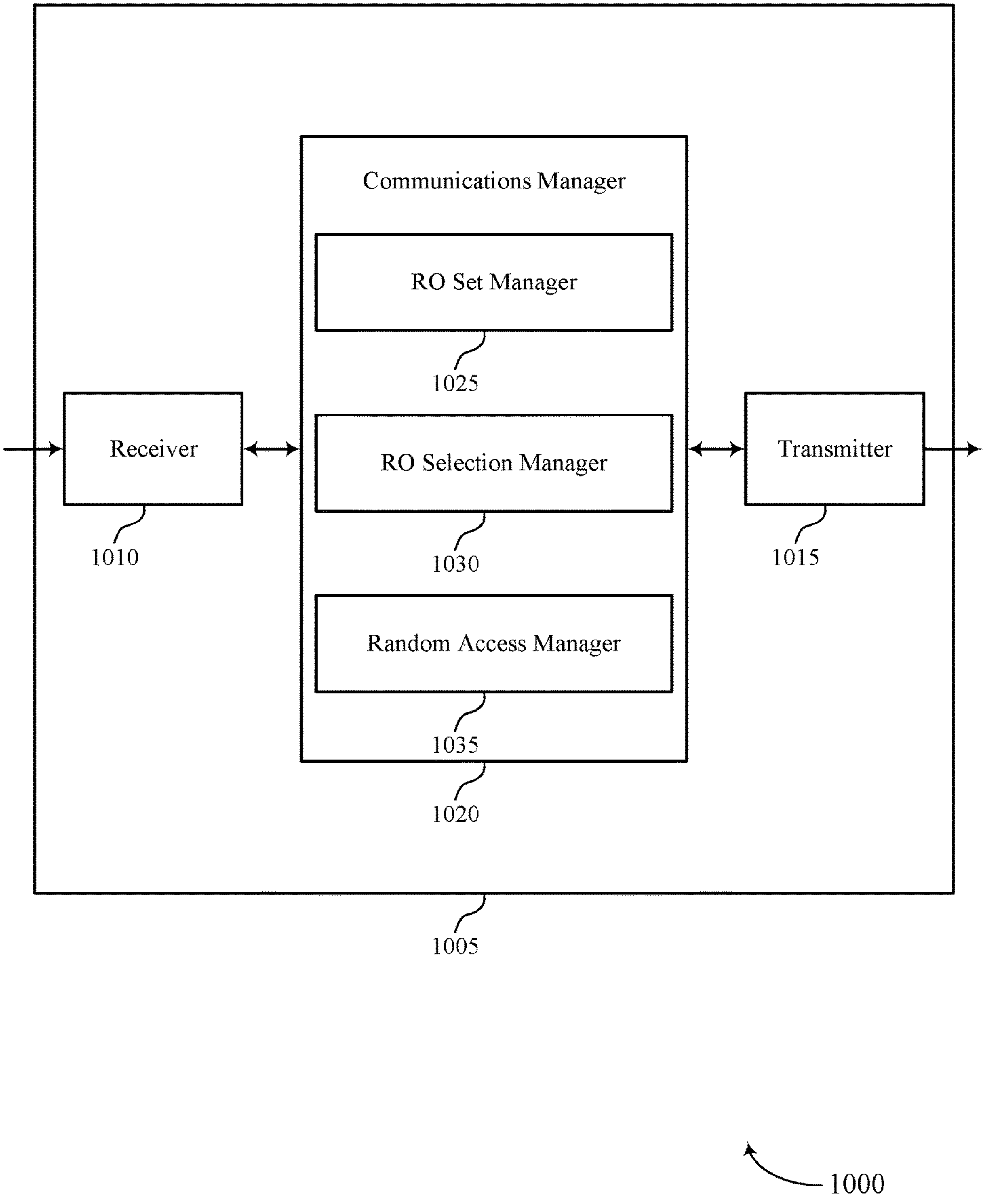

FIG. 10 shows a block diagram 1000 of a device 1005 that supports RO selection for SBFD capable devices in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005, or one of more components of the device 1005 (e.g., the receiver 1010, the transmitter 1015, the communications manager 1020), may include at least one processor, which may be coupled with at least one memory, to support the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of RO selection for SBFD capable devices as described herein. For example, the communications manager 1020 may include a RO set manager 1025, a RO selection manager 1030, a random access manager 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications in accordance with examples as disclosed herein. The RO set manager 1025 is capable of, configured to, or operable to support a means for outputting control signaling indicating a first set of ROs corresponding to a full duplex mode of operation and a second set of ROs associated with a HD mode of operation. The RO selection manager 1030 is capable of, configured to, or operable to support a means for outputting a control message including information associated with a determination of whether to use a RO from the first set of ROs or from the second set of ROs. The random access manager 1035 is capable of, configured to, or operable to support a means for obtaining a random access message via a first RO of the first set of ROs or the second set of ROS based on outputting the control message including the information.

Figure 11:
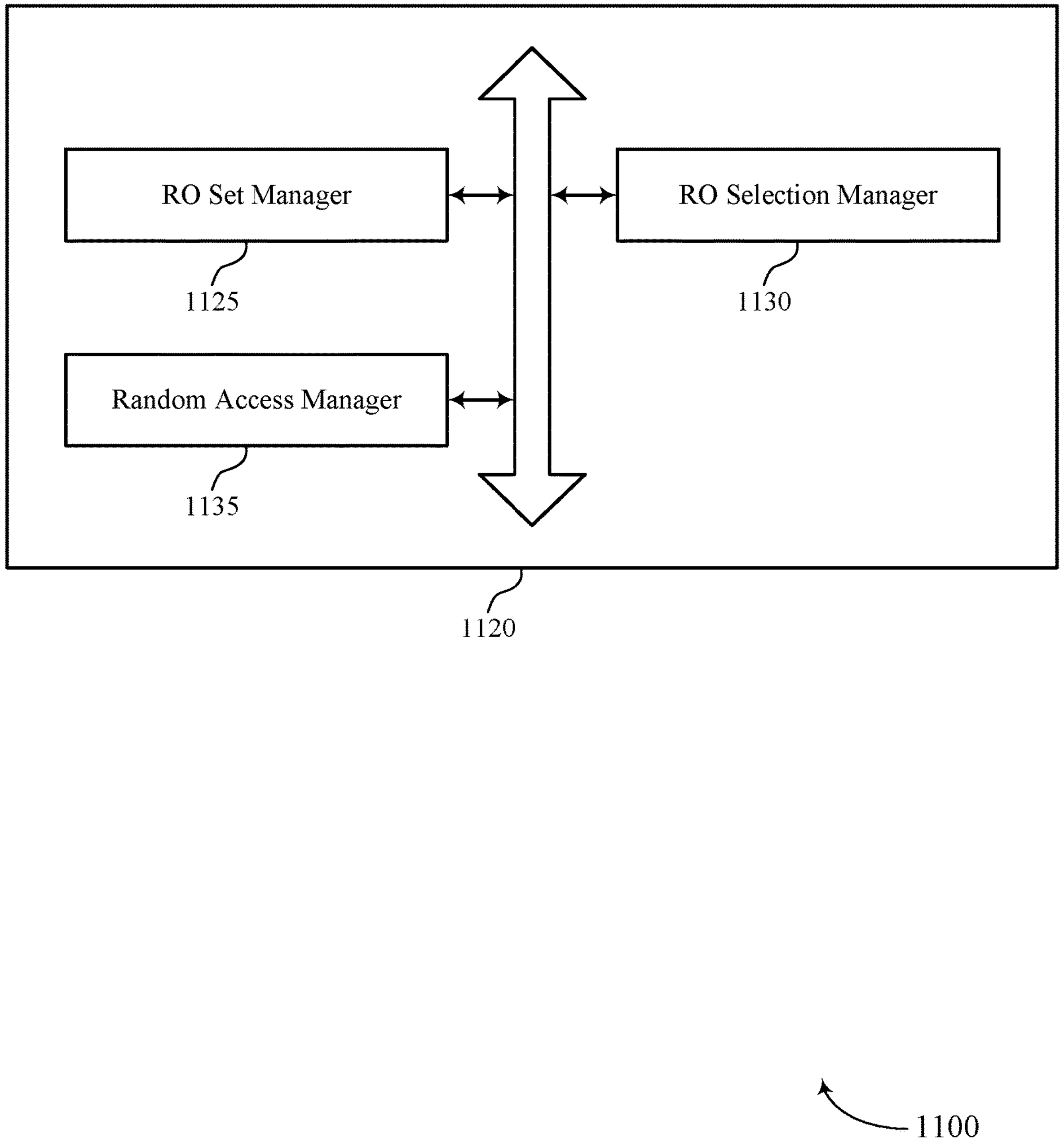
FIG. 11 shows a block diagram of a communications manager that supports RO selection for SBFD capable devices in accordance with one or more aspects of the present disclosure.

FIG. 11 shows a block diagram 1100 of a communications manager 1120 that supports RO selection for SBFD capable devices in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of RO selection for SBFD capable devices as described herein. For example, the communications manager 1120 may include a RO set manager 1125, a RO selection manager 1130, a random access manager 1135, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications in accordance with examples as disclosed herein. The RO set manager 1125 is capable of, configured to, or operable to support a means for outputting control signaling indicating a first set of ROs corresponding to a full duplex mode of operation and a second set of ROs associated with a HD mode of operation. The RO selection manager 1130 is capable of, configured to, or operable to support a means for outputting a control message including information associated with a determination of whether to use a RO from the first set of ROs or from the second set of ROs. The random access manager 1135 is capable of, configured to, or operable to support a means for obtaining a random access message via a first RO of the first set of ROs or the second set of ROs based on outputting the control message including the information.

In some examples, the information includes an indication of a first threshold value corresponding to the full duplex mode. In some examples, obtaining the random access message via the first RO is based on the first threshold value.

In some examples, the information includes a set of multiple threshold values, each threshold value of the set of multiple threshold values corresponding to a respective beam of a set of multiple beams, and obtaining the random access message via the first RO is based on the set of multiple threshold values.

In some examples, the information includes a set of multiple threshold values, each threshold value of the set of multiple threshold values corresponding to a type of random access transmission, and obtaining the random access message via the first RO is based on the random access message corresponding to a first type of random access transmission associated with a first threshold value of the set of multiple threshold values.

In some examples, the information includes an indication of a transmit power threshold, and obtaining the random access message via the first RO is based on a transmit power for the random access message satisfying the transmit power threshold.

In some examples, the transmit power threshold is based on a frequency resource of the first RO.

In some examples, obtaining the random access message via the first RO is based on whether a priority level of the random access message satisfies a priority level threshold, a remaining delay budget corresponding to an uplink package including the random access message satisfies a remaining delay budget threshold, a size of a payload of the random access message satisfies a payload size threshold, or any combination thereof.

In some examples, the information includes an indication of the priority level threshold, the remaining delay budget threshold, the payload size threshold, or any combination thereof.

In some examples, obtaining the random access message via the first RO is based on a type of the random access message, and the type of the random access message includes a message in a two-step random access procedure, a message in a four-step random access procedure, a system information request, a beam failure recovery request, or a connection setup message.

In some examples, the information includes an indication of whether the first RO is selected from the first set of ROs or from the second set of ROs for each type of the random access message.

In some examples, obtaining the random access message via the first RO is based on the first RO of the first set of ROs occurring prior to a candidate RO of the second set of ROs.

In some examples, the control message includes a radio resource control message indicating the first set of ROs or the second set of ROs. In some examples, obtaining the random access message via the first RO is based on the radio resource control message.

Figure 12:
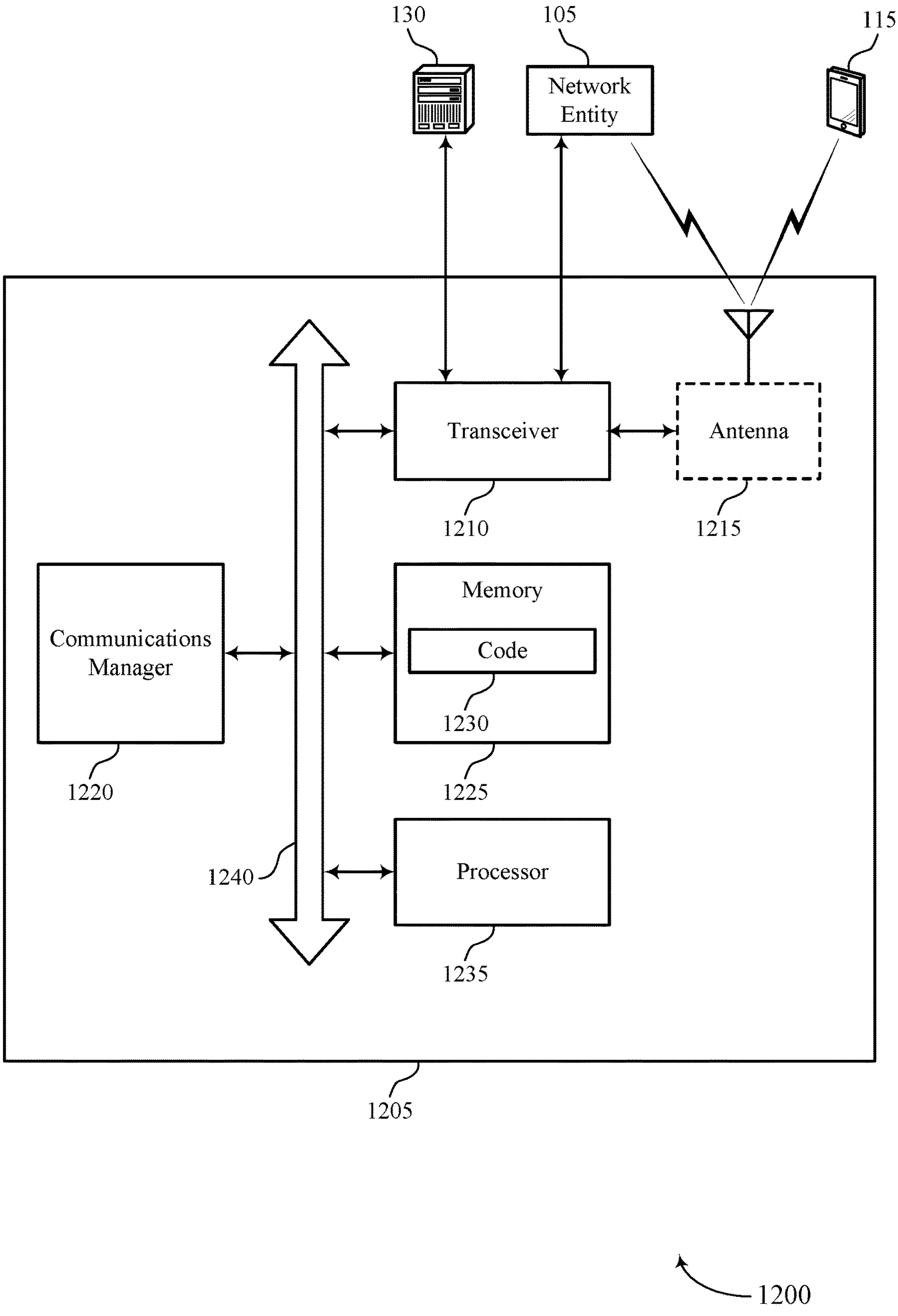
FIG. 12 shows a diagram of a system including a device that supports RO selection for SBFD capable devices in accordance with one or more aspects of the present disclosure.

FIG. 12 shows a diagram of a system 1200 including a device 1205 that supports RO selection for SBFD capable devices in accordance with one or more aspects of the present disclosure. The device 1205 may be an example of or include components of a device 905, a device 1005, or a network entity 105 as described herein. The device 1205 may communicate with other network devices or network equipment such as one or more of the network entities 105, UEs 115, or any combination thereof. The communications may include communications over one or more wired interfaces, over one or more wireless interfaces, or any combination thereof. The device 1205 may include components that support outputting and obtaining communications, such as a communications manager 1220, a transceiver 1210, one or more antennas 1215, at least one memory 1225, code 1230, and at least one processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or one or more memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or one or more memory components (e.g., the at least one processor 1235, the at least one memory 1225, or both), may be included in a chip or chip assembly that is installed in the device 1205. In some examples, the transceiver 1210 may be operable to support communications via one or more communications links (e.g., communication link(s) 125, backhaul communication link(s) 120, a midhaul communication link 162, a fronthaul communication link 168).

The at least one memory 1225 may include RAM, ROM, or any combination thereof. The at least one memory 1225 may store computer-readable, computer-executable, or processor-executable code, such as the code 1230. The code 1230 may include instructions that, when executed by one or more of the at least one processor 1235, cause the device 1205 to perform various functions described herein. The code 1230 may be stored in a non-transitory computer-readable medium such as system memory or another type of memory. In some cases, the code 1230 may not be directly executable by a processor of the at least one processor 1235 but may cause a computer (e.g., when compiled and executed) to perform functions described herein. In some cases, the at least one memory 1225 may include, among other things, a BIOS which may control basic hardware or software operation such as the interaction with peripheral components or devices. In some examples, the at least one processor 1235 may include multiple processors and the at least one memory 1225 may include multiple memories. One or more of the multiple processors may be coupled with one or more of the multiple memories which may, individually or collectively, be configured to perform various functions herein (for example, as part of a processing system).

The at least one processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1235 may be configured to operate a memory array using a memory controller. In some other cases, a memory controller may be integrated into one or more of the at least one processor 1235. The at least one processor 1235 may be configured to execute computer-readable instructions stored in a memory (e.g., one or more of the at least one memory 1225) to cause the device 1205 to perform various functions (e.g., functions or tasks supporting RO selection for SBFD capable devices). For example, the device 1205 or a component of the device 1205 may include at least one processor 1235 and at least one memory 1225 coupled with one or more of the at least one processor 1235, the at least one processor 1235 and the at least one memory 1225 configured to perform various functions described herein. The at least one processor 1235 may be an example of a cloud-computing platform (e.g., one or more physical nodes and supporting software such as operating systems, virtual machines, or container instances) that may host the functions (e.g., by executing code 1230) to perform the functions of the device 1205. The at least one processor 1235 may be any one or more suitable processors capable of executing scripts or instructions of one or more software programs stored in the device 1205 (such as within one or more of the at least one memory 1225). In some examples, the at least one processor 1235 may include multiple processors and the at least one memory 1225 may include multiple memories. One or more of the multiple processors may be coupled with one or more of the multiple memories, which may, individually or collectively, be configured to perform various functions herein. In some examples, the at least one processor 1235 may be a component of a processing system, which may refer to a system (such as a series) of machines, circuitry (including, for example, one or both of processor circuitry (which may include the at least one processor 1235) and memory circuitry (which may include the at least one memory 1225)), or components, that receives or obtains inputs and processes the inputs to produce, generate, or obtain a set of outputs. The processing system may be configured to perform one or more of the functions described herein. For example, the at least one processor 1235 or a processing system including the at least one processor 1235 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1225 or otherwise, to perform one or more of the functions described herein.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the at least one memory 1225, the code 1230, and the at least one processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with one or more other network devices (e.g., network entiites 105), and may include a controller or scheduler for controlling communications with UEs 115 (e.g., in cooperation with the one or more other network devices). In some examples, the communications manager 1220 may support an X2 interface within an LTE/LTE-A wireless communications network technology to provide communication between network entities 105.

The communications manager 1220 may support wireless communications in accordance with examples as disclosed herein. For example, the communications manager 1220 is capable of, configured to, or operable to support a means for outputting control signaling indicating a first set of ROs corresponding to a full duplex mode of operation and a second set of ROs associated with a HD mode of operation. The communications manager 1220 is capable of, configured to, or operable to support a means for outputting a control message including information associated with a determination of whether to use a RO from the first set of ROs or from the second set of ROs. The communications manager 1220 is capable of, configured to, or operable to support a means for obtaining a random access message via a first RO of the first set of ROs or the second set of ROs based on outputting the control message including the information.

By including or configuring the communications manager 1220 in accordance with examples as described herein, the device 1205 may support techniques for RO selection resulting in reduced processing, more efficiency utilization of system resources, decreased latency, reduced CLI, increased reliability of wireless communications, and improved user experience.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, one or more of the at least one processor 1235, one or more of the at least one memory 1225, the code 1230, or any combination thereof (for example, by a processing system including at least a portion of the at least one processor 1235, the at least one memory 1225, the code 1230, or any combination thereof). For example, the code 1230 may include instructions executable by one or more of the at least one processor 1235 to cause the device 1205 to perform various aspects of RO selection for SBFD capable devices as described herein, or the at least one processor 1235 and the at least one memory 1225 may be otherwise configured to, individually or collectively, perform or support such operations.

Figure 13:
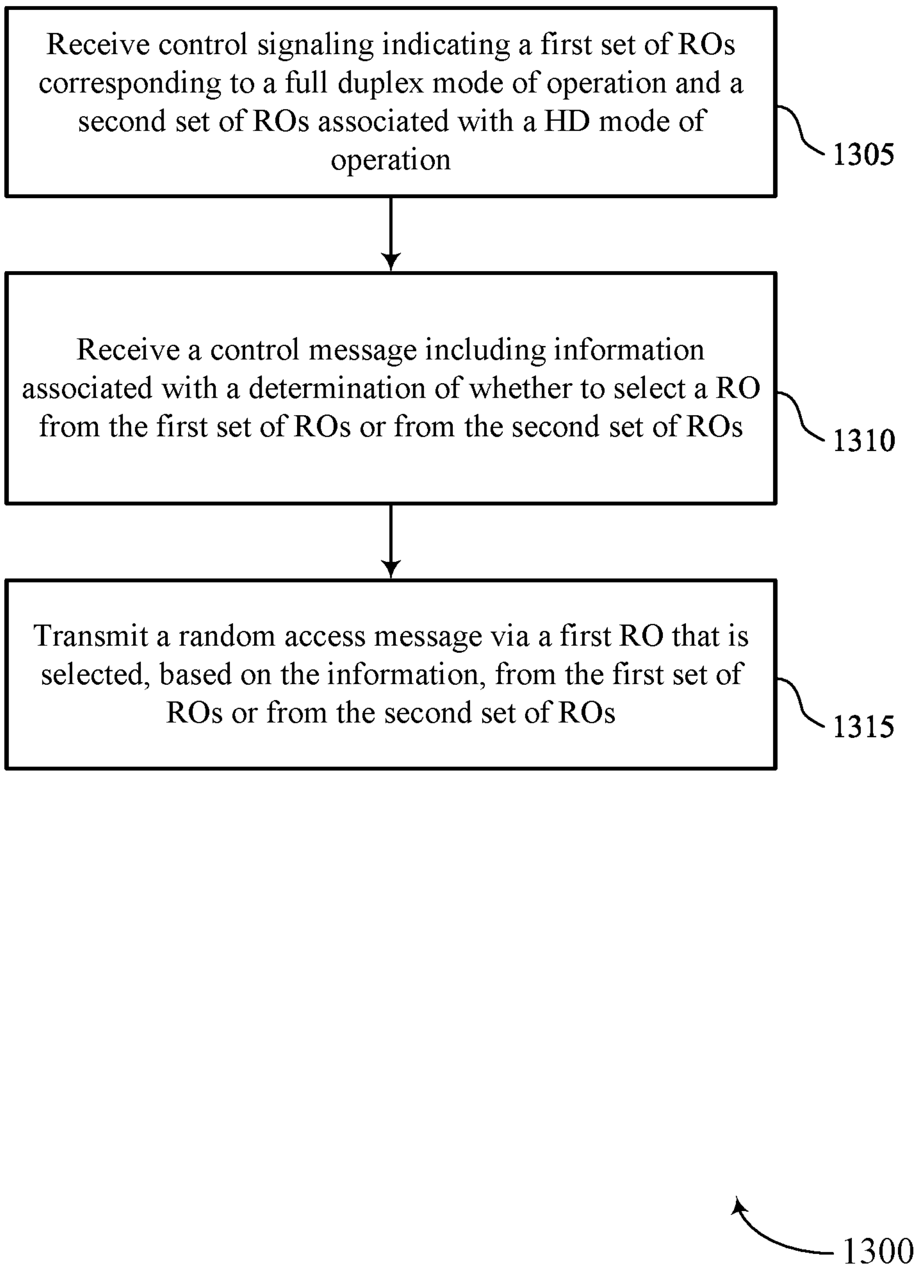
FIGS. 13 through 16 show flowcharts illustrating methods that support RO selection for SBFD capable devices in accordance with one or more aspects of the present disclosure.

FIG. 13 shows a flowchart illustrating a method 1300 that supports RO selection for SBFD capable devices in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a first set of ROs corresponding to a full duplex mode of operation and a second set of ROs associated with a HD mode of operation. The operations of 1305 may be performed in accordance with examples as disclosed herein. In some examples, aspects of the operations of 1305 may be performed by a RO set manager 725 as described with reference to FIG. 7.

At 1310, the method may include receiving a control message including information associated with a determination of whether to select a RO from the first set of ROs or from the second set of ROs. The operations of 1310 may be performed in accordance with examples as disclosed herein. In some examples, aspects of the operations of 1310 may be performed by a RO selection manager 730 as described with reference to FIG. 7.

At 1315, the method may include transmitting a random access message via a first RO that is selected, based on the information, from the first set of ROs or from the second set of ROs. The operations of 1315 may be performed in accordance with examples as disclosed herein. In some examples, aspects of the operations of 1315 may be performed by a random access manager 735 as described with reference to FIG. 7.

Figure 14:
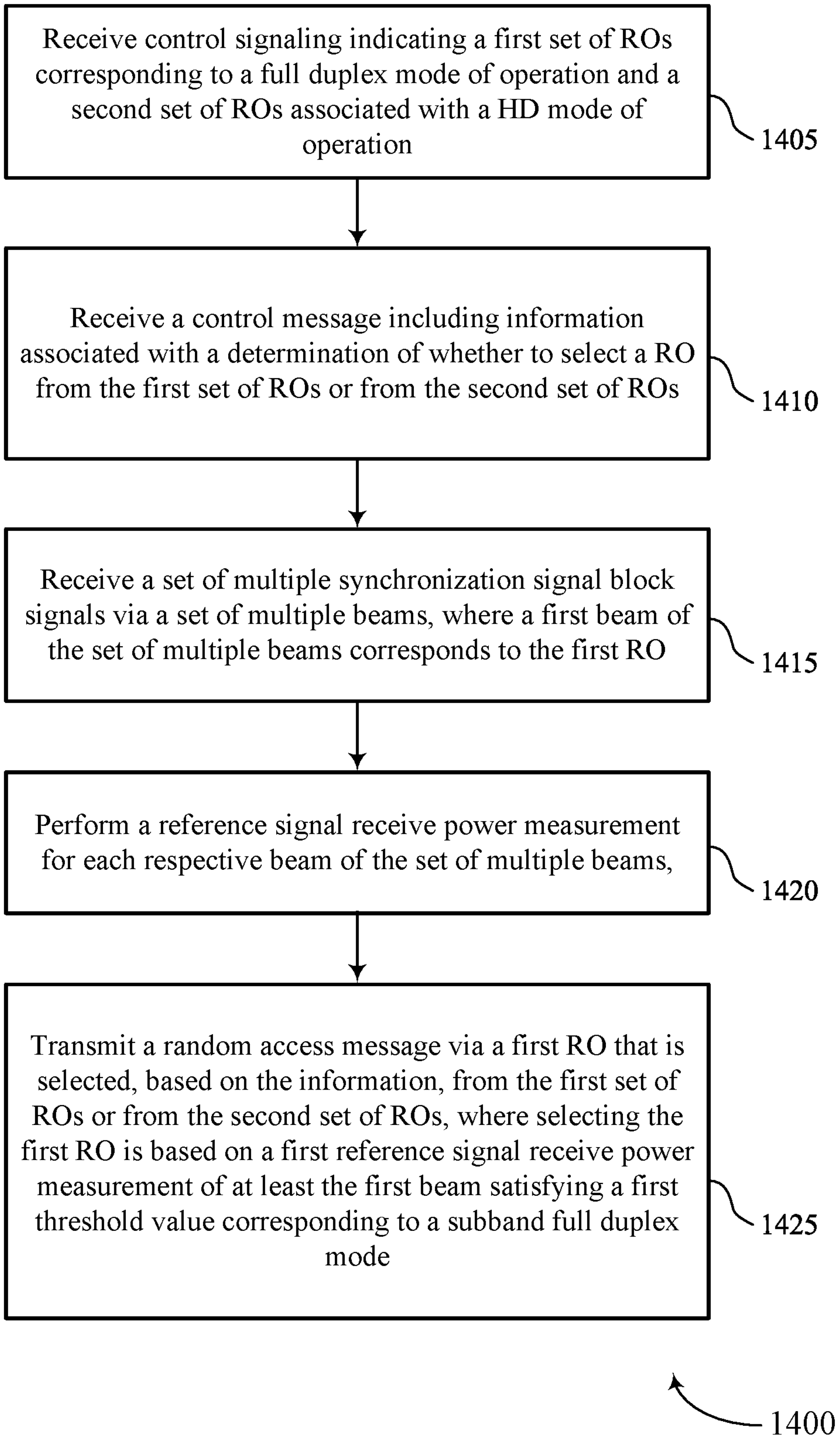

FIG. 14 shows a flowchart illustrating a method 1400 that supports RO selection for SBFD capable devices in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a first set of ROs corresponding to a full duplex mode of operation and a second set of ROs associated with a HD mode of operation. The operations of 1405 may be performed in accordance with examples as disclosed herein. In some examples, aspects of the operations of 1405 may be performed by a RO set manager 725 as described with reference to FIG. 7.

At 1410, the method may include receiving a control message including information associated with a determination of whether to select a RO from the first set of ROs or from the second set of ROs. The operations of 1410 may be performed in accordance with examples as disclosed herein.

In some examples, aspects of the operations of 1410 may be performed by a RO selection manager 730 as described with reference to FIG. 7.

At 1415, the method may include receiving a set of multiple synchronization signal block signals via a set of multiple beams, where a first beam of the set of multiple beams corresponds to the first RO. The operations of 1415 may be performed in accordance with examples as disclosed herein. In some examples, aspects of the operations of 1415 may be performed by a measurement manager 740 as described with reference to FIG. 7.

At 1420, the method may include performing a reference signal receive power measurement for each respective beam of the set of multiple beams. The operations of 1420 may be performed in accordance with examples as disclosed herein. In some examples, aspects of the operations of 1420 may be performed by a measurement manager 740 as described with reference to FIG. 7.

At 1425, the method may include transmitting a random access message via a first RO that is selected, based on the information, from the first set of ROs or from the second set of ROs, where selecting the first RO is based on a first reference signal receive power measurement of at least the first beam satisfying a first threshold value corresponding to a SBFD mode. The operations of 1425 may be performed in accordance with examples as disclosed herein. In some examples, aspects of the operations of 1425 may be performed by a random access manager 735 as described with reference to FIG. 7.

Figure 15:
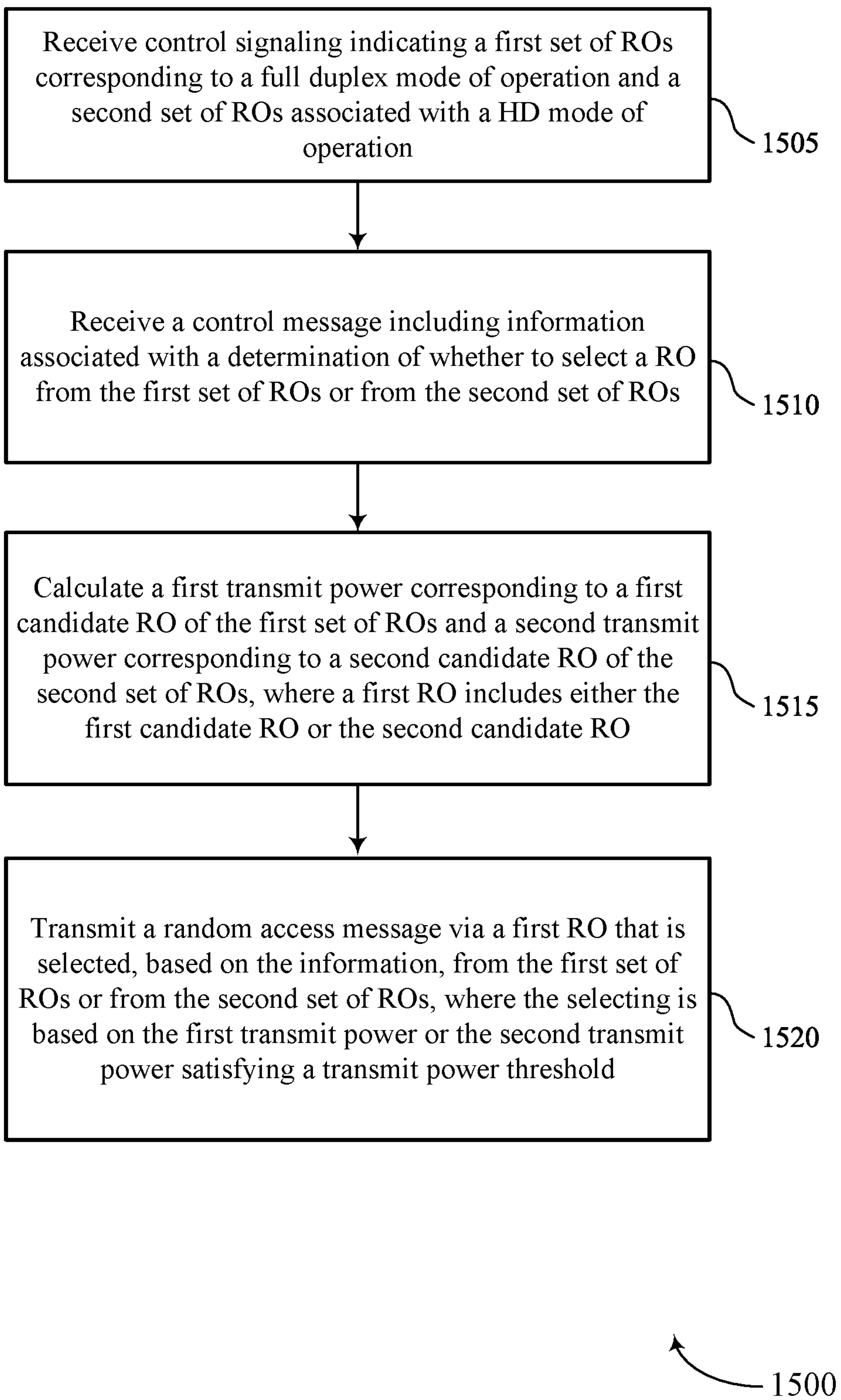

FIG. 15 shows a flowchart illustrating a method 1500 that supports RO selection for SBFD capable devices in accordance with one or more aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a first set of ROs corresponding to a full duplex mode of operation and a second set of ROs associated with a HD mode of operation. The operations of 1505 may be performed in accordance with examples as disclosed herein. In some examples, aspects of the operations of 1505 may be performed by a RO set manager 725 as described with reference to FIG. 7.

At 1510, the method may include receiving a control message including information associated with a determination of whether to select a RO from the first set of ROs or from the second set of ROs. The operations of 1510 may be performed in accordance with examples as disclosed herein. In some examples, aspects of the operations of 1510 may be performed by a RO selection manager 730 as described with reference to FIG. 7.

At 1515, the method may include calculating a first transmit power corresponding to a first candidate RO of the first set of ROs and a second transmit power corresponding to a second candidate RO of the second set of ROs, where a first RO includes either the first candidate RO or the second candidate RO. The operations of 1515 may be performed in accordance with examples as disclosed herein. In some examples, aspects of the operations of 1515 may be performed by a transmit power manager 745 as described with reference to FIG. 7.

At 1520, the method may include transmitting a random access message via a first RO that is selected, based on the information, from the first set of ROs or from the second set of ROs, where the selecting is based on the first transmit power or the second transmit power satisfying a transmit power threshold. The operations of 1520 may be performed in accordance with examples as disclosed herein. In some examples, aspects of the operations of 1520 may be performed by a random access manager 735 as described with reference to FIG. 7.

Figure 16:
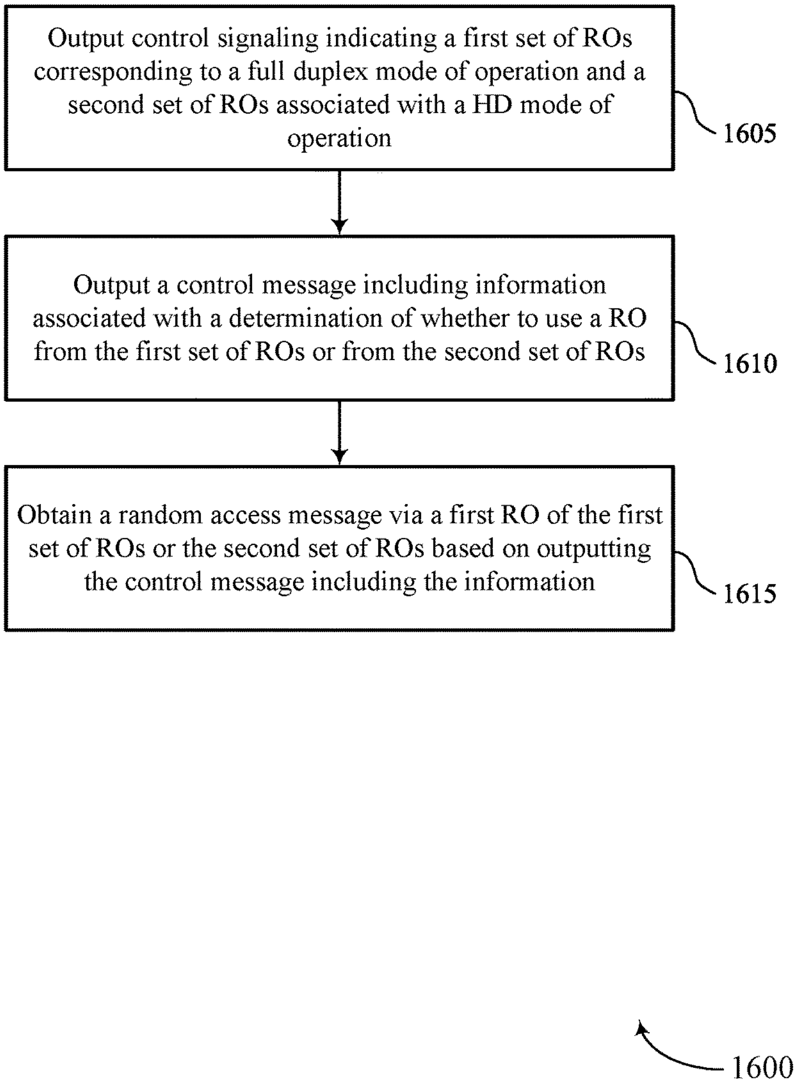

FIG. 16 shows a flowchart illustrating a method 1600 that supports RO selection for SBFD capable devices in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include outputting control signaling indicating a first set of ROs corresponding to a full duplex mode of operation and a second set of ROs associated with a HD mode of operation. The operations of 1605 may be performed in accordance with examples as disclosed herein. In some examples, aspects of the operations of 1605 may be performed by a RO set manager 1125 as described with reference to FIG. 11.

At 1610, the method may include outputting a control message including information associated with a determination of whether to use a RO from the first set of ROs or from the second set of ROs. The operations of 1610 may be performed in accordance with examples as disclosed herein. In some examples, aspects of the operations of 1610 may be performed by a RO selection manager 1130 as described with reference to FIG. 11.

At 1615, the method may include obtaining a random access message via a first RO of the first set of ROs or the second set of ROs based on outputting the control message including the information. The operations of 1615 may be performed in accordance with examples as disclosed herein. In some examples, aspects of the operations of 1615 may be performed by a random access manager 1135 as described with reference to FIG. 11.

The following provides an overview of aspects of the present disclosure:

Aspect 1: A method for wireless communications at a UE, comprising: receiving control signaling indicating a first set of ROs corresponding to a full duplex mode of operation and a second set of ROs associated with a HD mode of operation; receiving a control message comprising information associated with a determination of whether to select a RO from the first set of ROs or from the second set of ROs; and transmitting a random access message via a first RO that is selected, based at least in part on the information, from the first set of ROs or from the second set of ROs.

Aspect 2: The method of aspect 1, further comprising: receiving a plurality of synchronization signal block signals via a plurality of beams, wherein a first beam of the plurality of beams corresponds to the first RO; and performing a reference signal receive power measurement for each respective beam of the plurality of beams, wherein selecting the first RO is based at least in part on a first reference signal receive power measurement of at least the first beam satisfying a first threshold value corresponding to a SBFD mode.

Aspect 3: The method of aspect 2, wherein the information comprises an indication of the first threshold value corresponding to the SBFD mode.

Aspect 4: The method of any of aspects 2 through 3, wherein the information comprises a plurality of threshold values comprising the first threshold value, each threshold value of the plurality of threshold values corresponding to a respective beam of the plurality of beams.

Aspect 5: The method of any of aspects 2 through 4, wherein the information comprises a plurality of threshold values comprising the first threshold value, each threshold value of the plurality of threshold values corresponding to a type of random access transmission, and selecting the first RO is based at least in part on the random access message corresponding to a first type of random access transmission associated with the first threshold value.

Aspect 6: The method of any of aspects 1 through 5, further comprising: calculating a first transmit power corresponding to a first candidate RO of the first set of ROs and a second transmit power corresponding to a second candidate RO of the second set of ROs, wherein the first RO comprises either the first candidate RO or the second candidate RO, and wherein the selecting is based at least in part on the first transmit power or the second transmit power satisfying a transmit power threshold.

Aspect 7: The method of aspect 6, wherein the information comprises an indication of the transmit power threshold.

Aspect 8: The method of any of aspects 6 through 7, wherein the information comprises a plurality of transmit power thresholds comprising the transmit power threshold, each transmit power threshold of the plurality of transmit power thresholds corresponding to a respective beam of a plurality of beams.

Aspect 9: The method of any of aspects 6 through 8, wherein the transmit power threshold is based at least in part on a frequency resource of the first RO.

Aspect 10: The method of any of aspects 1 through 9, wherein selecting the first RO is based at least in part on whether a priority level of the random access message satisfies a priority level threshold, a remaining delay budget corresponding to an uplink package comprising the random access message satisfies a remaining delay budget threshold, a size of a payload of the random access message satisfies a payload size threshold, or any combination thereof.

Aspect 11: The method of aspect 10, wherein the information comprises an indication of the priority level threshold, the remaining delay budget threshold, the payload size threshold, or any combination thereof.

Aspect 12: The method of any of aspects 1 through 11, wherein selecting the first RO is based at least in part on a type of the random access message, and the type of the random access message comprises a message in a two-step random access procedure, a message in a four-step random access procedure, a system information request, a beam failure recovery request, or a connection setup message.

Aspect 13: The method of aspect 12, wherein the information comprises an indication of whether the UE is to select the first RO from the first set of ROs or from the second set of ROs for each type of the random access message.

Aspect 14: The method of any of aspects 1 through 13, wherein selecting the first RO is based at least in part on the first RO of the first set of ROs occurring prior to a candidate RO of the second set of ROs.

Aspect 15: The method of any of aspects 1 through 14, wherein the control message comprises a radio resource control message indicating the first set of ROs or the second set of ROs, selecting the first RO is based at least in part on the radio resource control message.

Aspect 16: A method for wireless communications at a network entity, comprising: outputting control signaling indicating a first set of ROs corresponding to a full duplex mode of operation and a second set of ROs associated with a HD mode of operation; outputting a control message comprising information associated with a determination of whether to use a RO from the first set of ROs or from the second set of ROs; and obtaining a random access message via a first RO of the first set of ROs or the second set of ROs based at least in part on outputting the control message comprising the information.

Aspect 17: The method of aspect 16, wherein the information comprises an indication of a first threshold value corresponding to the full duplex mode, and obtaining the random access message via the first RO is based at least in part on the first threshold value.

Aspect 18: The method of any of aspects 16 through 17, wherein the information comprises a plurality of threshold values, each threshold value of the plurality of threshold values corresponding to a respective beam of a plurality of beams, and obtaining the random access message via the first RO is based at least in part on the plurality of threshold values.

Aspect 19: The method of any of aspects 16 through 18, wherein the information comprises a plurality of threshold values, each threshold value of the plurality of threshold values corresponding to a type of random access transmission, and obtaining the random access message via the first RO is based at least in part on the random access message corresponding to a first type of random access transmission associated with a first threshold value of the plurality of threshold values.

Aspect 20: The method of any of aspects 16 through 19, wherein the information comprises an indication of a transmit power threshold, and obtaining the random access message via the first RO is based at least in part on a transmit power for the random access message satisfying the transmit power threshold.

Aspect 21: The method of aspect 20, wherein the transmit power threshold is based at least in part on a frequency resource of the first RO.

Aspect 22: The method of any of aspects 16 through 21, wherein obtaining the random access message via the first RO is based at least in part on whether a priority level of the random access message satisfies a priority level threshold, a remaining delay budget corresponding to an uplink package comprising the random access message satisfies a remaining delay budget threshold, a size of a payload of the random access message satisfies a payload size threshold, or any combination thereof.

Aspect 23: The method of aspect 22, wherein the information comprises an indication of the priority level threshold, the remaining delay budget threshold, the payload size threshold, or any combination thereof.

Aspect 24: The method of any of aspects 16 through 23, wherein obtaining the random access message via the first RO is based at least in part on a type of the random access message, and the type of the random access message comprises a message in a two-step random access procedure, a message in a four-step random access procedure, a system information request, a beam failure recovery request, or a connection setup message.

Aspect 25: The method of aspect 24, wherein the information comprises an indication of whether the first RO is selected from the first set of ROs or from the second set of ROs for each type of the random access message.

Aspect 26: The method of any of aspects 16 through 25, wherein obtaining the random access message via the first RO is based at least in part on the first RO of the first set of ROs occurring prior to a candidate RO of the second set of ROs.

Aspect 27: The method of any of aspects 16 through 26, wherein the control message comprises a radio resource control message indicating the first set of ROs or the second set of ROs, obtaining the random access message via the first RO is based at least in part on the radio resource control message.

Aspect 28: A UE for wireless communications, comprising one or more memories storing processor-executable code, and one or more processors coupled with the one or more memories and individually or collectively operable to execute the code to cause the UE to perform a method of any of aspects 1 through 15.

Aspect 29: A UE for wireless communications, comprising at least one means for performing a method of any of aspects 1 through 15.

Aspect 30: A non-transitory computer-readable medium storing code for wireless communications, the code comprising instructions executable by one or more processors to perform a method of any of aspects 1 through 15.

Aspect 31: A network entity for wireless communications, comprising one or more memories storing processor-executable code, and one or more processors coupled with the one or more memories and individually or collectively operable to execute the code to cause the network entity to perform a method of any of aspects 16 through 27.

Aspect 32: A network entity for wireless communications, comprising at least one means for performing a method of any of aspects 16 through 27.

Aspect 33: A non-transitory computer-readable medium storing code for wireless communications, the code comprising instructions executable by one or more processors to perform a method of any of aspects 16 through 27.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
- one or more memories storing processor-executable code; and
- one or more processors coupled with the one or more memories and individually or collectively operable to execute the code to cause the UE to:
  - receive control signaling indicating a first set of random access occasions corresponding to a full duplex mode of operation and a second set of random access occasions associated with a half duplex mode of operation;
  - receive a control message comprising information associated with a determination of whether to select a random access occasion from the first set of random access occasions or from the second set of random access occasions; and
  - transmit a random access message via a first random access occasion that is selected, based at least in part on the information, from the first set of random access occasions or from the second set of random access occasions.

2. The UE of claim 1, wherein the one or more processors are individually or collectively further operable to execute the code to cause the UE to:
- receive a plurality of synchronization signal block signals via a plurality of beams, wherein a first beam of the plurality of beams corresponds to the first random access occasion; and
- perform a reference signal receive power measurement for each respective beam of the plurality of beams, wherein selecting the first random access occasion is based at least in part on a first reference signal receive power measurement of at least the first beam satisfying a first threshold value corresponding to a subband full duplex mode.

3. The UE of claim 2, wherein the information comprises an indication of the first threshold value corresponding to the subband full duplex mode.

4. The UE of claim 2, wherein the information comprises a plurality of threshold values comprising the first threshold value, each threshold value of the plurality of threshold values corresponding to a respective beam of the plurality of beams.

5. The UE of claim 2, wherein:

the information comprises a plurality of threshold values comprising the first threshold value, each threshold value of the plurality of threshold values corresponding to a type of random access transmission, and selecting the first random access occasion is based at least in part on the random access message corresponding to a first type of random access transmission associated with the first threshold value.

6. The UE of claim 1, wherein the one or more processors are individually or collectively further operable to execute the code to cause the UE to:

calculate a first transmit power corresponding to a first candidate random access occasion of the first set of random access occasions and a second transmit power corresponding to a second candidate random access occasion of the second set of random access occasions, wherein the first random access occasion comprises either the first candidate random access occasion or the second candidate random access occasion, and wherein the selecting is based at least in part on the first transmit power or the second transmit power satisfying a transmit power threshold.

7. The UE of claim 6, wherein the information comprises an indication of the transmit power threshold.

8. The UE of claim 6, wherein the information comprises a plurality of transmit power thresholds comprising the transmit power threshold, each transmit power threshold of the plurality of transmit power thresholds corresponding to a respective beam of a plurality of beams.

9. The UE of claim 6, wherein the transmit power threshold is based at least in part on a frequency resource of the first random access occasion.

10. The UE of claim 1, wherein selecting the first random access occasion is based at least in part on whether a priority level of the random access message satisfies a priority level threshold, a remaining delay budget corresponding to an uplink package comprising the random access message satisfies a remaining delay budget threshold, a size of a payload of the random access message satisfies a payload size threshold, or any combination thereof.

11. The UE of claim 10, wherein the information comprises an indication of the priority level threshold, the remaining delay budget threshold, the payload size threshold, or any combination thereof.

12. The UE of claim 1, wherein:

selecting the first random access occasion is based at least in part on a type of the random access message, and the type of the random access message comprises a message in a two-step random access procedure, a message in a four-step random access procedure, a system information request, a beam failure recovery request, or a connection setup message.

13. The UE of claim 12, wherein the information comprises an indication of whether the UE is to select the first random access occasion from the first set of random access occasions or from the second set of random access occasions for each type of the random access message.

14. The UE of claim 1, wherein selecting the first random access occasion is based at least in part on the first random access occasion of the first set of random access occasions occurring prior to a candidate random access occasion of the second set of random access occasions.

15. The UE of claim 1, wherein:

the control message comprises a radio resource control message indicating the first set of random access occasions or the second set of random access occasions, and selecting the first random access occasion is based at least in part on the radio resource control message.

16. A network entity, comprising:

one or more memories storing processor-executable code; and one or more processors coupled with the one or more memories and individually or collectively operable to execute the code to cause the network entity to:

output control signaling indicating a first set of random access occasions corresponding to a full duplex mode of operation and a second set of random access occasions associated with a half duplex mode of operation;

output a control message comprising information associated with a determination of whether to use a random access occasion from the first set of random access occasions or from the second set of random access occasions; and obtain a random access message via a first random access occasion of the first set of random access occasions or the second set of random access occasions based at least in part on outputting the control message comprising the information.

17. The network entity of claim 16, wherein:

the information comprises an indication of a first threshold value corresponding to the full duplex mode, and obtaining the random access message via the first random access occasion is based at least in part on the first threshold value.

18. The network entity of claim 16, wherein the information comprises a plurality of threshold values, each threshold value of the plurality of threshold values corresponding to a respective beam of a plurality of beams, and obtaining the random access message via the first random access occasion is based at least in part on the plurality of threshold values.

19. The network entity of claim 16, wherein the information comprises a plurality of threshold values, each threshold value of the plurality of threshold values corresponding to a type of random access transmission, and obtaining the random access message via the first random access occasion is based at least in part on the random access message corresponding to a first type of random access transmission associated with a first threshold value of the plurality of threshold values.

20. The network entity of claim 16, wherein the information comprises an indication of a transmit power threshold, and obtaining the random access message via the first random access occasion is based at least in part on a transmit power for the random access message satisfying the transmit power threshold.

21. The network entity of claim 20, wherein the transmit power threshold is based at least in part on a frequency resource of the first random access occasion.

22. The network entity of claim 16, wherein obtaining the random access message via the first random access occasion is based at least in part on whether a priority level of the random access message satisfies a priority level threshold, a remaining delay budget corresponding to an uplink package comprising the random access message satisfies a remaining delay budget threshold, a size of a payload of the random access message satisfies a payload size threshold, or any combination thereof.

23. The network entity of claim 22, wherein the information comprises an indication of the priority level threshold, the remaining delay budget threshold, the payload size threshold, or any combination thereof.

24. The network entity of claim 16, wherein obtaining the random access message via the first random access occasion is based at least in part on a type of the random access message, and the type of the random access message comprises a message in a two-step random access procedure, a message in a four-step random access procedure, a system information request, a beam failure recovery request, or a connection setup message.

25. The network entity of claim 24, wherein the information comprises an indication of whether the first random access occasion is selected from the first set of random access occasions or from the second set of random access occasions for each type of the random access message.

26. The network entity of claim 16, wherein obtaining the random access message via the first random access occasion is based at least in part on the first random access occasion of the first set of random access occasions occurring prior to a candidate random access occasion of the second set of random access occasions.

27. The network entity of claim 16, wherein:

the control message comprises a radio resource control message indicating the first set of random access occasions or the second set of random access occasions, and obtaining the random access message via the first random access occasion is based at least in part on the radio resource control message.

28. A method for wireless communications at a user equipment (UE), comprising:

receiving control signaling indicating a first set of random access occasions corresponding to a full duplex mode of operation and a second set of random access occasions associated with a half duplex mode of operation;

receiving a control message comprising information associated with a determination of whether to select a random access occasion from the first set of random access occasions or from the second set of random access occasions; and transmitting a random access message via a first random access occasion that is selected, based at least in part on the information, from the first set of random access occasions or from the second set of random access occasions.

29. The method of claim 28, further comprising:

receiving a plurality of synchronization signal block signals via a plurality of beams, wherein a first beam of the plurality of beams corresponds to the first random access occasion; and performing a reference signal receive power measurement for each respective beam of the plurality of beams, wherein selecting the first random access occasion is based at least in part on a first reference signal receive power measurement of at least the first beam satisfying a first threshold value corresponding to a subband full duplex mode.

30. A method for wireless communications at a network entity, comprising:

outputting control signaling indicating a first set of random access occasions corresponding to a full duplex mode of operation and a second set of random access occasions associated with a half duplex mode of operation;

outputting a control message comprising information associated with a determination of whether to use a random access occasion from the first set of random access occasions or from the second set of random access occasions; and obtaining a random access message via a first random access occasion of the first set of random access occasions or the second set of random access occasions based at least in part on outputting the control message comprising the information.

* * * * *